United States Patent [19]

Suskind

[11] Patent Number: 5,540,962
[45] Date of Patent: Jul. 30, 1996

[54] DEGRADABLE PACKAGE FOR CONTAINMENT OF LIQUIDS

[75] Inventor: Stuart P. Suskind, Wayne, Pa.

[73] Assignee: Leonard Pearlstein, Gladwyne, Pa.

[21] Appl. No.: 223,707

[22] Filed: Apr. 6, 1994

Related U.S. Application Data

[63] Continuation-in-part of Ser. No. 962,100, Oct. 19, 1992, abandoned, and a continuation-in-part of Ser. No. 154,456, Nov. 19, 1993, Pat. No. 5,458,933.

[51] Int. Cl.⁶ .................................................. B65D 71/00
[52] U.S. Cl. ....................... 428/34.2; 428/34.6; 428/35.7; 428/513; 428/514; 428/481; 206/812
[58] Field of Search ........................... 428/34.2, 34.3, 428/481, 34.6, 35.7, 513, 514; 206/233, 494, 812, 209, 524.2

[56] References Cited

U.S. PATENT DOCUMENTS

| | | | |
|---|---|---|---|
| Re. 33,376 | 10/1990 | Gibbons et al. | 428/34.2 |
| D. 269,329 | 6/1983 | Malamoud | D10/18 |
| 967,688 | 8/1910 | Titherley | 424/443 |
| 1,466,888 | 9/1923 | Morrissey | 15/208 |
| 1,786,513 | 12/1930 | Zuckerman | 252/91 |
| 2,109,749 | 3/1938 | McColl | 15/104.93 |
| 2,187,163 | 1/1940 | Langer | 15/104.93 |
| 2,367,520 | 1/1945 | Patek | 229/3.1 |
| 2,840,080 | 6/1958 | Clark | 604/289 |
| 2,999,265 | 9/1961 | Duane et al. | 424/443 |
| 3,057,467 | 10/1962 | Williams | 206/361 |
| 3,129,867 | 4/1964 | Schroeder | 220/462 |
| 3,150,049 | 9/1964 | Emory | 424/447 |
| 3,206,907 | 9/1965 | Schroeder | 53/449 |
| 3,234,858 | 2/1966 | Rein et al. | 493/60 |
| 3,240,326 | 3/1966 | Miller | 206/361 |
| 3,263,891 | 8/1966 | Brugh, Jr. | 229/3.1 |
| 3,264,188 | 8/1966 | Gresham | 428/485 |
| 3,305,383 | 2/1967 | Gordy | 427/416 |
| 3,414,927 | 12/1968 | Worcester | 15/104.93 |
| 3,485,349 | 12/1969 | Chaney | 206/492 |
| 3,495,507 | 2/1970 | Haas et al. | 493/287 |
| 3,499,575 | 3/1970 | Rockefeller | 221/55 |
| 3,533,533 | 10/1970 | Chaney, Jr. | 221/25 |
| 3,561,994 | 2/1971 | Dwyre | 427/212 |
| 3,604,613 | 9/1971 | Haas et al. | 229/190 |
| 3,624,224 | 11/1971 | Watchung et al. | 424/443 |

(List continued on next page.)

FOREIGN PATENT DOCUMENTS

| | | |
|---|---|---|
| 0194097 | 9/1986 | European Pat. Off. . |
| 0197485 | 10/1986 | European Pat. Off. . |
| 0240009 | 10/1987 | European Pat. Off. . |
| 0370192 | 5/1990 | European Pat. Off. . |
| 0397510 | 11/1990 | European Pat. Off. . |
| 0459110 | 12/1991 | European Pat. Off. . |
| 0534471 | 3/1993 | European Pat. Off. . |
| 976091 | 3/1951 | France . |
| 2302925 | 10/1976 | France . |
| 460625 | 7/1968 | Switzerland . |
| 928610 | 6/1963 | United Kingdom . |
| 1454599 | 11/1976 | United Kingdom . |
| WO93/02947 | 2/1993 | WIPO . |

OTHER PUBLICATIONS

E. W. Veazey, "The Potential Of LLDPE In Coextruded Film," First Annual Paper, Film and Foil Converter, Feb. 1982, pp. 41–46.

Abstract (J04298345) for "Paper Container Which Degrades In Environment," Oct. 22, 1992.

Abstract (J04062054) for "Decomposable Laminated Sheet Preparation For Packaging Foods, Etc." Feb. 27, 1992.

International Search Report, dated 10 Jan. 1994, mailed 18 Jan. 1994.

Primary Examiner—James J. Seidleck
Assistant Examiner—Michael A. Williamson
Attorney, Agent, or Firm—Finnegan, Henderson, Farabow, Garrett & Dunner

[57] ABSTRACT

A compostable paperboard container and package for liquids is coated with a polymeric material capable of degrading under composting conditions and subsequently in the presence of light to form carbon dioxide, water, and biomass.

28 Claims, 19 Drawing Sheets

U.S. PATENT DOCUMENTS

| | | | |
|---|---|---|---|
| 3,657,760 | 4/1972 | Kudisch | 15/104.93 |
| 3,659,772 | 5/1972 | Dorsey et al. | 229/3.1 |
| 3,753,952 | 8/1973 | Gillet | 260/63 R |
| 3,754,642 | 8/1973 | Stidolph | 206/45.14 |
| 3,784,055 | 1/1974 | Anderson | 221/46 |
| 3,784,056 | 1/1974 | Spruyt et al. | 221/63 |
| 3,794,698 | 2/1974 | Diaz et al. | 524/585 |
| 3,841,466 | 10/1974 | Hoffman et al. | 206/205 |
| 3,844,987 | 10/1974 | Clendinning et al. | 47/66 |
| 3,850,863 | 11/1974 | Clendinning et al. | 260/7.5 |
| 3,852,913 | 12/1974 | Clendinning et al. | 47/74 |
| 3,860,538 | 1/1975 | Guillet et al. | 260/2.5 HA |
| 3,867,324 | 2/1975 | Clendinning et al. | 260/23 H |
| 3,881,210 | 5/1975 | Drach et al. | 15/104.93 |
| 3,901,838 | 8/1975 | Clendinning et al. | 260/23 H |
| 3,904,074 | 9/1975 | Hoffman et al. | 220/339 |
| 3,919,163 | 11/1975 | Clendinning et al. | 47/66 |
| 3,923,729 | 12/1975 | Clendinning et al. | 47/66 |
| 3,929,937 | 12/1975 | Clendinning et al. | 525/190 |
| 3,953,169 | 4/1976 | Igarashi et al. | 8/192 |
| 3,958,056 | 5/1976 | Brugh, Jr. et al. | 428/215 |
| 3,965,518 | 6/1976 | Muoio | 15/104.93 |
| 3,965,519 | 6/1976 | Hermann | 15/104.93 |
| 3,972,467 | 8/1976 | Whillock et al. | 220/450 |
| 4,000,816 | 1/1977 | Spruyt | 220/339 |
| 4,026,458 | 5/1977 | Morris et al. | 229/30 |
| 4,112,167 | 9/1978 | Dake et al. | 428/154 |
| 4,131,195 | 12/1978 | Worrell, Sr. | 206/205 |
| 4,147,836 | 4/1979 | Middleton et al. | 428/481 |
| 4,200,319 | 4/1980 | Cooper | 294/1.4 |
| 4,220,244 | 9/1980 | Elmore | 206/210 |
| 4,237,190 | 12/1980 | McGee | 428/513 |
| 4,245,744 | 1/1981 | Daniels et al. | 206/210 |
| 4,267,928 | 5/1981 | Curry, Jr. | 206/583 |
| 4,285,719 | 8/1981 | Criss | 71/13 |
| 4,292,366 | 9/1981 | Fulton, Jr. | 428/293 |
| 4,309,469 | 1/1982 | Varona | 428/74 |
| 4,332,319 | 6/1982 | Hurwood | 206/210 |
| 4,339,507 | 7/1982 | Kurtz et al. | 428/522 |
| 4,343,134 | 8/1982 | Davidowich et al. | 53/431 |
| 4,362,781 | 12/1982 | Anderson | 428/291 |
| 4,372,447 | 2/1983 | Miller | 206/210 |
| 4,381,246 | 4/1983 | Anderson | 252/91 |
| 4,427,111 | 1/1984 | Laipply | 206/210 |
| 4,435,344 | 3/1984 | Iioka | 264/45.1 |
| 4,437,567 | 3/1984 | Jeng | 206/210 |
| 4,448,704 | 5/1984 | Barby et al. | 252/91 |
| 4,452,846 | 6/1984 | Akao | 428/335 |
| 4,525,396 | 6/1985 | Takasa et al. | 428/34.2 |
| 4,537,807 | 8/1985 | Chan et al. | 428/74 |
| 4,552,484 | 11/1985 | Nuttle | 405/128 |
| 4,559,157 | 12/1985 | Smith et al. | 292/90 |
| 4,565,468 | 1/1986 | Crawford | 405/270 |
| 4,575,891 | 3/1986 | Valente | 15/104.93 |
| 4,576,865 | 3/1986 | Akao | 428/335 |
| 4,590,126 | 5/1986 | Andersson | 428/346 |
| 4,660,737 | 4/1987 | Green et al. | 220/410 |
| 4,666,621 | 5/1987 | Clark et al. | 428/227 |
| 4,678,698 | 7/1987 | Mencke | 206/812 |
| 4,696,393 | 9/1987 | Laipply | 206/210 |
| 4,698,246 | 10/1987 | Gibbons et al. | 428/34.2 |
| 4,701,360 | 10/1987 | Gibbons et al. | 428/34.2 |
| 4,725,489 | 2/1988 | Jones et al. | 428/289 |
| 4,732,797 | 3/1988 | Johnson et al. | 428/74 |
| 4,739,897 | 4/1988 | Nakamura | 206/205 |
| 4,741,944 | 5/1988 | Jackson et al. | 428/152 |
| 4,753,844 | 6/1988 | Jones et al. | 428/288 |
| 4,772,501 | 9/1988 | Johnson et al. | 428/74 |
| 4,778,699 | 10/1988 | Knox, III et al. | 428/35.2 |
| 4,789,575 | 12/1988 | Gibbons et al. | 428/34.2 |
| 4,795,665 | 1/1989 | Lancaster et al. | 428/34.2 |
| 4,796,751 | 1/1989 | Madkour | 206/223 |
| 4,806,398 | 2/1989 | Martin, Jr. | 428/34.2 |
| 4,806,399 | 2/1989 | Gibbons et al. | 428/34.2 |
| 4,817,790 | 4/1989 | Porat et al. | 206/205 |
| 4,828,912 | 5/1989 | Hossain et al. | 530/361 |
| 4,857,605 | 8/1989 | Lutz | 525/445 |
| 4,880,696 | 11/1989 | Yanidis | 428/349 |
| 4,882,221 | 11/1989 | Bogart et al. | 428/308.8 |
| 4,904,524 | 2/1990 | Yoh | 428/311.3 |
| 4,948,640 | 8/1990 | Gibbons et al. | 428/34.9 |
| 4,950,510 | 8/1990 | Massouda | 428/34.2 |
| 4,988,984 | 1/1991 | Gonzalez-Lopez | 345/132 |
| 4,997,091 | 3/1991 | McCrea | 206/584 |
| 4,998,984 | 3/1991 | McClendon | 206/205 |
| 5,049,440 | 9/1991 | Bornhoeft, III et al. | 428/288 |
| 5,050,742 | 9/1991 | Muckenfuhs | 206/494 |
| 5,059,459 | 10/1991 | Huffman | 428/34.2 |
| 5,064,699 | 11/1991 | Havens et al. | 428/35.7 |
| 5,065,868 | 11/1991 | Cornelissen et al. | 206/494 |
| 5,096,650 | 3/1992 | Renna | 264/322 |
| 5,096,939 | 3/1992 | Mor | 523/125 |
| 5,096,940 | 3/1992 | Mor | 523/125 |
| 5,107,549 | 4/1992 | Pitts et al. | 4/245.2 |
| 5,124,371 | 6/1992 | Tokiwa et al. | 523/124 |
| 5,125,565 | 6/1992 | Rogers | 229/115 |
| 5,213,858 | 5/1993 | Tanner et al. | 428/34.2 |
| 5,286,538 | 2/1994 | Pearlstein et al. | 428/34.2 |

FIG. 12

| SAMPLE REFERENCE | PCL P787 | 1 | 2 | 3 | 4 | 5 |
|---|---|---|---|---|---|---|
| CARBON %: | 62.46 | 45.38 | 45.64 | 47.16 | 45.84 | 47.39 |
| INITIAL WEIGHT (g): | 0.3130 | 0.5662 | 0.6063 | 0.5425 | 0.5743 | 0.5308 |
| FINAL WEIGHT (g): | 0.2174 | 0.3328 | 0.3545 | 0.2023 | 0.2746 | 0.1255 |
| ACTUAL TOTAL CO2 (mg): | 155 | 189 | 212 | 456 | 415 | 612 |
| | | | | | | |
| INITIAL WEIGHT (g): | 0.3130 | 0.5662 | 0.6063 | 0.5425 | 0.5743 | 0.5308 |
| CARBON FRACTION: | 0.6246 | 0.4538 | 0.4564 | 0.4716 | 0.4584 | 0.4739 |
| AVAILABLE GRAMS C: | 0.1955 | 0.2569 | 0.2767 | 0.2558 | 0.2633 | 0.2515 |
| THEORETICAL CO2 (g): | 0.7164 | 0.9415 | 1.0140 | 0.9375 | 0.9647 | 0.9218 |
| | | | | | | |
| % C TO CO2: | 21.64 | 20.07 | 20.91 | 48.64 | 43.02 | 66.40 |
| | | | | | | |
| WEIGHT LOSS (g): | 0.0956 | 0.2334 | 0.2518 | 0.3402 | 0.2997 | 0.4053 |
| CARBON FRACTION: | 0.6246 | 0.4538 | 0.4564 | 0.4716 | 0.4584 | 0.4739 |
| AVAILABLE GRAMS C: | 0.0597 | 0.1059 | 0.1149 | 0.1604 | 0.1374 | 0.1921 |
| THEORETICAL CO2 (g): | 0.2188 | 0.3881 | 0.4211 | 0.5879 | 0.5034 | 0.7038 |
| CARBON CONV. EFFICIENCY (%) | 70.84 | 48.70 | 50.34 | 77.56 | 82.44 | 86.95 |

AEROBIC BIODEGRADATION OF POLYCAPROLACTONE (ASTM D5209)

| INOCULUM EXPOSURE (DAYS) | CUMULATIVE CARBON DIOXIDE (mg) |
|---|---|
| 0 | 0 |
| 5 | 22.2 |
| 19 | 145.1 |
| 32 | 299.8 |
| 42 | 406.8 |
| 50 | 484.2 |
| 60 | 532.1 |

FIG. 13

AEROBIC BIODEGRADATION OF POLYCAPROLACTONE POLYETHYLENE BLENDS

| | CUMULATIVE CARBON DIOXIDE (mg) | |
|---|---|---|
| INOCULM EXPOSURE (DAYS) | 90% PCL 10% LLDPE | 80% PCL 20% LLDPE |
| 0 | 0 | 0 |
| 5 | 24.6 | 19.8 |
| 19 | 228.9 | 125.8 |
| 32 | 361.0 | 198.4 |
| 42 | 391.8 | 220.4 |
| 50 | 406.3 | 256.3 |
| 60 | 440.5 | 287.8 |

FIG. 18

DEGRADABLE PACKAGE FOR CONTAINMENT OF LIQUIDS

This application is a continuation-in-part of U.S. patent application Ser. No. 07/962,100, filed Oct. 16, 1992 now abandoned, and is a continuation-in-part of U.S. patent application Ser. No. 08/154,456 now U.S. Pat. No. 5,458,933, filed Nov. 19, 1993.

BACKGROUND OF THE INVENTION

This application is being filed concurrently with an application entitled A METHOD OF MAKING AND USING A DEGRADABLE PACKAGE FOR CONTAINMENT OF LIQUIDS to Stuart P. Suskind, which is incorporated in its entirety herein by reference.

FIELD OF THE INVENTION

The present invention relates to a degradable or compostable container for containing a liquid or liquid containing materials. The present invention further relates to a paperboard container having a degradable coating on at least one of the internal or external surfaces thereof. More particularly, the present invention relates to a paperboard container which will biodegrade to carbon dioxide, water and biomass under composting conditions. The present invention further relates to a method of making and a method of using the degradable container.

The present invention further relates to a degradable paperboard container which may be biodegraded initially under composting conditions and finally photodegraded as a humus or compost upon exposure to light.

DESCRIPTION OF THE RELATED ART

In the management of Municipal Solid Waste (MSW), the expectation that paper and paper products would biodegrade in landfills has proven to be unreliable. In fact, newspapers buried for over fifty years have been recovered from landfills in readable condition. Since paper comprises about 50% of landfill space, it has become an important priority to find alternate ways to manage paper waste.

Recycling paper, often with the removal of printing inks and coatings, has proven to be economically feasible when the recovered pulp fibers find new markets and applications. Fiber recovery and, in particular, repeated fiber recoveries tend to damage, break, and otherwise reduce the quality of paper fiber. This degradation in paper quality often results in a product with limited or nonexistent new markets or applications.

Since paper has the inherent property of biodegradability under appropriate conditions, more attractive alternates to simple landfilling have received increased attention. Among these is the process of composting, in which waste is degraded to humus or biomass under accelerated and controlled conditions of moisture, air, and microorganisms. More specifically, paper, under composting conditions is converted into carbon dioxide, water, and biomass (this process is also referred to as mineralization). The biomass is essentially comprised of microorganisms. Thus, the mass of waste is significantly reduced and the humus by-product has commercial value. Markets for the end-product of composting, usually referred to simply as compost or humus, are emerging. Compost, for example, is an excellent soil conditioner in marshy applications; and the uses of compost in wetland reclamation and water conservation appear quite promising. Compost is also used as a fertilizer and mulch in many farming and highway applications.

Paper products can be coated with resins or plastic materials to provide barrier properties when used in the containment of liquids. For example, U.S. Pat. No. 5,286,538 to Pearlstein et al., which is incorporated in its entirety herein by reference, relates to biodegradable and compostable containers for wet wipes comprising paperboard (about 85% by weight) with a polyethylene coating on both sides. In the composting process, microorganisms attack the cut edges of the container material leading ultimately to a biodegradation of the paperboard with a residue of polyethylene film.

Copending Application Ser. No. 07/962,100 describes an improved product having a polymeric coating selected from among various aliphatic polyesters leading to a liquid packaging material ultimately capable of complete mineralization. However, the storage stability properties of aliphatic polyesters may not provide the optimum conditions for the storage of all products.

The need exists, therefore, to find suitable compositions and constructions for packages which are both compostable and effective barriers to moisture vapor. The most important requirements for these packages include:

a. barrier properties to reduce and prevent absorption and/or transmission of liquid components;

b. heat sealability for carton construction and integrity;

c. printability to provide attractive, non-functional graphics;

d. vapor barriers to contain fragrances, flavors, moisture, etc.;

e. barriers to oxygen and other ambient gases;

f. rigidity, shape retention, and crush resistance, g. compostability to a humus with commercial value as a soil conditioner, where the humus is capable of ultimate mineralization.

The use of polyolefins and especially polyethylene in degradable liquid packaging has been described, for example, in U.S. Pat. No. 5,213,858 (Tanner et al.), which is incorporated in its entirety herein by reference. Tanner et al. relates to a coated paperboard having an inner coating of polyethylene and an outer coating of a biodegradable mixture of starch and polyethylene or a polyvinyl alcohol with some biodegradable properties. This combination of coatings, however, does not meet the above stated requirements. In particular, polyvinyl alcohol has an extremely high rate of moisture vapor transmission and its rate of biodegradation is slow. Further, starch filled resins have been shown to be only pitted by bacteria through selective attack on the carbohydrate. Furthermore, the inner coating is provided with no means at all for degradation.

Low density polyethylene is used extensively in liquid packaging. Among its most important attributes are low cost, heat sealability, barrier to moisture vapor, and clarity.

In fact, as described in copending application Ser. No. 07/962,100, particular blends of polyethylene and an aliphatic polyester such as polycaprolactone represent improvements in the moisture barrier properties of the polyester. Unfortunately, at levels significantly over about 30 wt % polyethylene, the rate of biodegradation is reduced to below practical levels.

Molded articles such as planters for seedlings made from aliphatic polyesters, as described in U.S. Pat. No. 3,867,324, when left in the ground are expected to ultimately biodegrade.

Specific blends of aliphatic polyesters and photodegradable polyethylene are described in U.S. Pat. No. 3,901,838 to Clendinning et al., for application in certain industrial and consumer plastic products which may degrade upon discarding. Similarly, U.S. Pat. No. 4,857,605 describes a blend of an aliphatic polyester with a photodegradable alternating copolymer of ethylene and carbon monoxide. The above three patents are incorporated in their entirety herein by reference.

As can be seen, a coated paperboard meeting the performance requirements of a liquid packaging material and capable of ultimate mineralization after composting has not been achieved previously.

Ever since their widespread use in packaging and related applications, plastics have been known to undergo a number of degradation processes which, in time, led to the undesirable loss of strength, embrittlement, discoloration, etc. These degradations are usually the result of changes in polymer molecular structure such as chain scission, unzipping of the polymer chain, and rearrangements leading to fragmentation and changes in cross-link density.

In the last forty to fifty years, major research efforts have led to successful solutions and preventive measures designed to avoid molecular breakdown, usually in the form of additives and selected polymer design. Greater understanding of the chemical and physical nature of degradation was invaluable in achieving these practical solutions. The mechanisms of hydrolysis, oxidation, and biological attack, often acting in concert, are known to be involved in most polymer degradation.

Looking ahead into the 21st century, the management of solid waste, particularly in the more densely populated regions of the planet, will become a matter of increasing concern. Solid waste from the packaging of food, personal, and medical products is certainly a major contributor to the overall problem. It has now become necessary to find ways to destroy the very materials that we have learned to stabilize and protect.

In the most preferred application of our knowledge and technology in this field, packaging materials would be designed to perform their intended function during manufacture, shipping, storage, and end-use; and then, upon disposal, would self initiate a degradation process leading ultimately to complete mineralization of the organic matter to water and carbon dioxide.

Now, in the present invention, it has been found that coatings of a biodegradable polymer on a first side of the paperboard and of a polyolefin such as polyethylene on the second side of a paperboard can be formulated and designed so that in the presence of composting conditions, degradation of the first coating and the paperboard substrate take place at an acceptable rate leaving the second side as a polyolefin residue. Furthermore, it has been found that when properly formulated, the polyolefin coating is photodegraded to carbon dioxide, water and biomass upon exposure to sunlight.

SUMMARY OF THE INVENTION

It is an object of the present invention to overcome the previously encountered difficulties.

Given the current waste disposal problems, another object of the present invention is to provide a container for liquids and liquid containing materials meeting the foregoing requirements (a)–(g).

A further object of the present invention is to provide a liquid packaging material in the form of a composite of at least three layers in which a substrate layer is a biodegradable paper or paperboard, a first coating layer is a biodegradable film or coating at a thickness of about 0.5 to about 3.0 mil on one surface of the substrate, and a second coating layer is a photodegradable polyolefin at a thickness of about 0.5 to about 3.0 mils on a second surface of the substrated layer.

A further object of the present invention is to provide a leakproof heat sealable package for liquids or liquid containing materials having a low rate of moisture vapor transmission.

Yet another object of the present invention is to provide a package which yields compost or humus when subjected to composting conditions. The compost comprises a biodegraded film or coating, biodegraded paper or paperboard, and a polyolefin residue which is degraded when exposed to sunlight.

A further object of the present invention is to provide, as an environmentally improved alternative to plastic, a completely degradable packaging material for the containment of liquids and wet products.

Still another object of the present invention is to provide crush-resistant, durable packaging material suitable for liquids and wet products.

An additional object of the present invention is to provide coated packaging material for use in folded cartons in which the coating has a composting rate approximately equal to the pulp based substrate.

Another object of the present invention is to provide special properties to coatings of biodegradable aliphatic polyesters, by blending them with up to about 30% by weight polymers or fillers that are either miscible or mechanically compatible.

A further object of the present invention is to blend biodegradable and compostable aliphatic polyesters with polyolefins that are degradable upon exposure to light through a photochemical process.

Still another object of the present invention is to coat both sides of a paperboard having two sides with blends of biodegradable/compostable polymers containing polyolefins that are photodegradable and present at levels up to about 15% by weight.

Another object of the present invention is to provide a leakproof degradable container for the containment of liquids or liquid containing materials, which can be biodegraded under composting conditions and then photodegraded as humus or compost upon exposure to light.

Finally, an object of the present invention is to provide a compostable container with improved water vapor transmission properties for the containment of liquids or liquid containing materials, having a polymeric coating thereon which contains a paraffin wax component.

To achieve the objects and in accordance with the purpose of the present invention, as embodied and broadly described herein, one embodiment of the present invention is a compostable package for containing liquids or liquid containing materials which includes a base of paperboard having two sides and having coated on one side a biodegradable linear aliphatic polyester and on the other side a photodegradable polyolefin, wherein the base is degradable to form carbon dioxide, water, and biomass.

In another aspect of the present invention, there is provided a method of making a compostable package for containing a liquid or a liquid containing material including the steps of, providing a base of paperboard having two sides; coating one side of the paperboard with a biodegradable film capable of preventing leaks, and coating the other side with a photodegradable polyolefin, wherein the base is compostable to carbon dioxide, water, and biomass; forming the paperboard into a container; sealing the edges and bottom of the container, and placing into said container a liquid or a material containing a liquid.

In a further aspect of the present invention, there is a method of composting a coated paperboard including the steps of, providing a base of paperboard having two sides; coating one side of the paperboard with a biodegradable linear aliphatic polyester and coating the other side with a photodegradable polyolefin, subjecting the coated paperboard to composting conditions to degrade the biodegradable polyester and paperboard base to carbon dioxide, water, and biomass and subjecting the photodegradable polyolefin to light to cause degradation thereof.

Additional objects and advantages of the present invention will be set forth in part in the description which follows, and in part will be obvious from the description, or may be learned by practice of the invention. The objects and advantages of the present invention will be realized and attained by means of the elements and combinations particularly pointed out in the appended claims.

BRIEF DESCRIPTION OF THE DRAWINGS

FIGS. 12 and 13 illustrate the aerobic biodegradation of polycaprolactone using ASTM D5209.

FIG. 18 illustrates the aerobic biodegradation of blends of polycaprolactone and polyethylene.

DETAILED DESCRIPTION

Figure 1A:
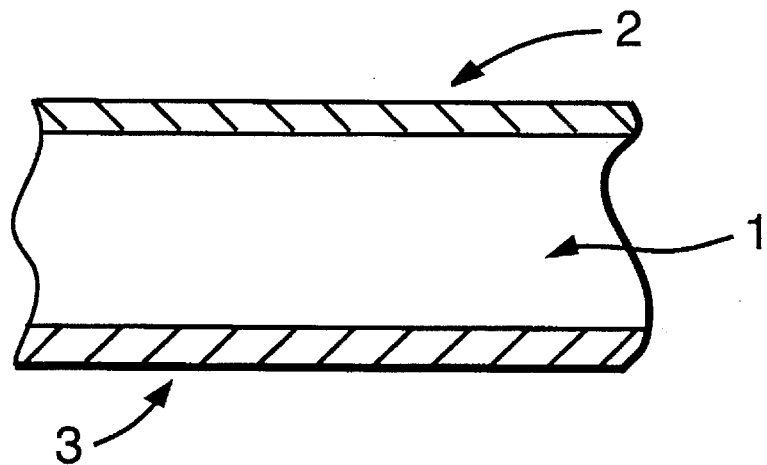
FIGS. 1a and 1b illustrate cross-sectional views of the structure of container materials embodied by the present invention.

According to the present invention, a paperboard container is produced for containing liquids or liquid containing materials. The container is formed from paperboard or related paper substrates. For the purposes of this invention, the term paperboard includes those grades and types of paper made on either cylinder board machines or multiwire, fourdrinier type machines as well as multiformers. Fiber stock may be either recycled, virgin or mixtures thereof, bleached or unbleached. Additional information on paper and the paperboard used in packaging applications may be found in James E. Kline, Chapter 10, *Paper and Paperboard*, Miller Freeman Publications, San Francisco, Calif., 1982, which is incorporated in its entirety herein by reference.

The paperboard or paper substrate for use in the present invention may have any basis weight commonly used in the production of paperboard containers and known by those skilled in the art. Preferably, the paperboard or paper substrate has a basis weight of at least about 30 lbs/ream, more preferably a basis weight of from about 35 lbs/ream to about 220 lbs/ream and most preferably from about 175 lbs/ream to about 220 lbs/ream. According to one embodiment of the present invention, the paper substrate preferably has a thickness of from about 4 to about 25 mils and more preferably from about 10 to about 20 mils. Though not preferred, other thicknesses may be used. Also, the coated paperboard is selected to produce a container having a cross directional (CD) stiffness (as determined by the Taber method) such that the container will withstand ordinary use. Preferably, the coated paperboard is selected to produce a container having a CD stiffness of from about 50 to about 150 and more preferably of from about 60 to about 135. The Taber method is described in *TAPPI* Test Procedure T-489.

The ratio of cross direction Taber stiffness of the coated paperboard to its basis weight (lb/ream) is selected such that the material is sufficiently rigid at a given thickness for use in the manufacture of containers and is preferably at least about 0.20 and more preferably at least about 0.5.

Paperboard is generally stronger and stiffer in the machine direction (MD) than in the cross direction. According to one embodiment of the present invention the machine direction preferably runs along the container from side to side, i.e. in a direction perpendicular with the top and bottom of the container. When the machine direction runs from side to side of the container, the fiber direction of the paperboard from top to bottom of the container is said to be the cross direction. The coated paperboard used in the container according to the present invention preferably has a ratio of Taber stiffness of MD/CD such that containers have a balanced rigidity in all directions and preferably of less than or equal to about 2.65 and more preferably less than or equal to about 1.92.

The paperboard or paper substrate material is coated on at least one side thereof with a degradable resin preferably in a thickness of from about 0.5 to about 3.0 mils. In one preferred embodiment, both sides of the paperboard substrate are coated with the degradable resin to a thickness of preferably from about 0.5 to about 3.0 mils. While a coating on one or both sides of the paperboard in a thickness of about 0.5 to about 3.0 mils is preferred, the coating can have other thicknesses such that the requirements of (a)–(g), above, are achieved. In the present invention, degradation includes biodegradation as well as degradation by moisture, light, oxygen, and other well known means of breaking down waste material.

Coating techniques, for example, extrusion coating, impregnation and the like, are well known in the art, and in accordance with the present invention, inner coatings and outer coatings may be applied by processes well known in the art. Furthermore, the design, quality control and fabrication of folded cartons for the containment of liquids are well known in the art, and these processes and techniques may be used in making the containers of the present invention.

Characteristics of the biodegradable coating materials for use in the present invention include good moisture barrier properties, good thermal sealing properties, sufficient stiffness to give the container good crush resistance, and biodegradability under the composting conditions.

Examples of biodegradable resins include thermoplastic oxyalkanoyl polymers, e.g., ε-caprolactone polymers and those that contain the recurring unit:

$$-O(CH_2)_x-\overset{|}{C}=O$$

wherein x is an integer preferably having a value of 2, 3 and 5–7, including polymers of beta propriolactone and Δ-valerolactone; polyesters of 3-hydroxybutyric acid, 3-hydroxyvaleric acid and mixtures thereof as well as copolymers of any of the above.

The suitable biodegradable resins are graft polymers prepared by reacting a lactone such as ε-caprolactone with hydroxyl or amino functional resins such as hydrolyzed ethylene vinyl acetate copolymers; segmented polyurethane prepared by reacting polycaprolactone bearing-terminal hydroxyl groups with diisocyanates and, optionally, chain-extending glycols such as 1,4 butanediol.

Other biodegradable resins which can be used in the present invention include aliphatic polyesters and linear aliphatic polyesters such as polyglycolic acid, polylactic acid, polydioxanone, poly(trimethylene carbonate) and their co- and terpolymers as well as blends of any of the above with polyesters prepared from alkanediols and alkanedicarboxylic acids including oxalates.

Preferred biodegradable resins for use in the present invention are polyhydroxyaliphatic acids (PHAA).

Polyhydroxyaliphatic acids in film form are biodegradable under composting conditions. One preferred polyhydroxyaliphatic acid, polycaprolactone (PCL), is available as a biodegradable thermoplastic resin from Union Carbide. It is synthesized from ε-caprolactone:

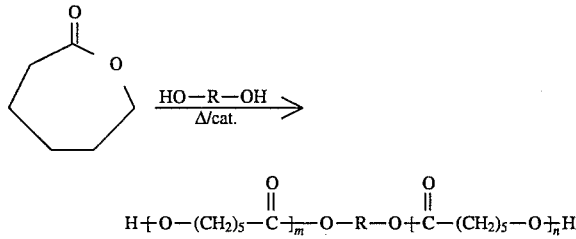

Figure 16:
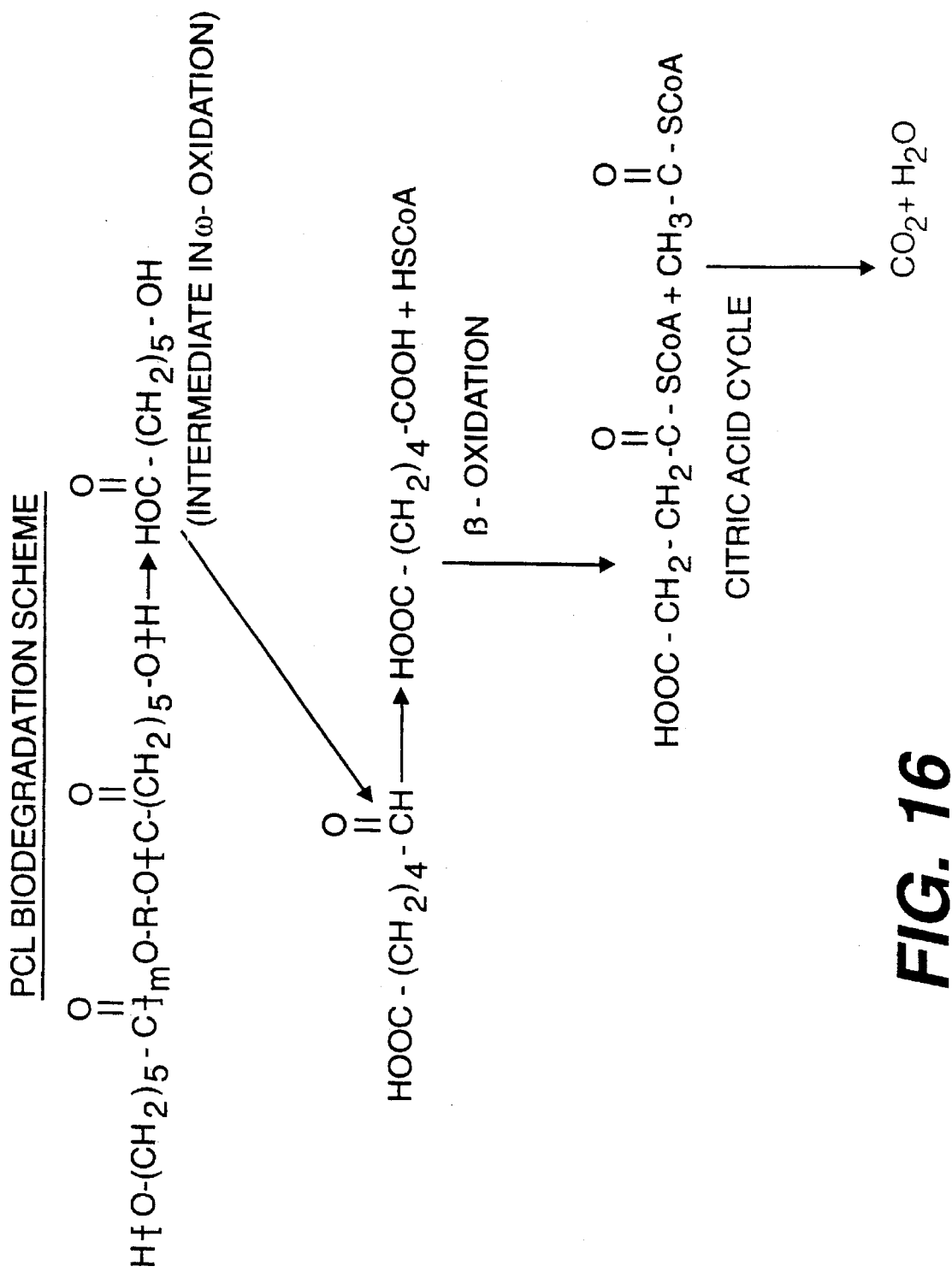
FIG. 16 illustrates the biodegradability mechanism for polycaprolactone.

Polycaprolactone in film form, has been demonstrated to be biodegradable under soil burial and composting conditions, as shown in FIGS. 7–15. Composting of PCL is thought to occur by the mechanism proposed in FIG. 16.

Other preferred biodegradable resins for use in the present invention are the commercially available PHBV polymers of ICI which are polyesters of 3-hydroxybutyric (HB) and 3-hydroxyvaleric (HV) acids. Their general structure is

PHBV COPOLYMERS

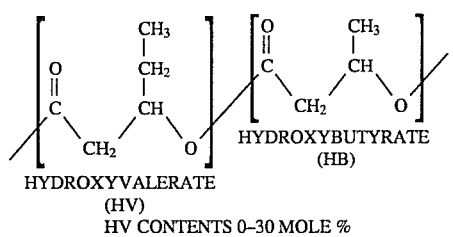

HV CONTENTS 0–30 MOLE %

Figure 17:
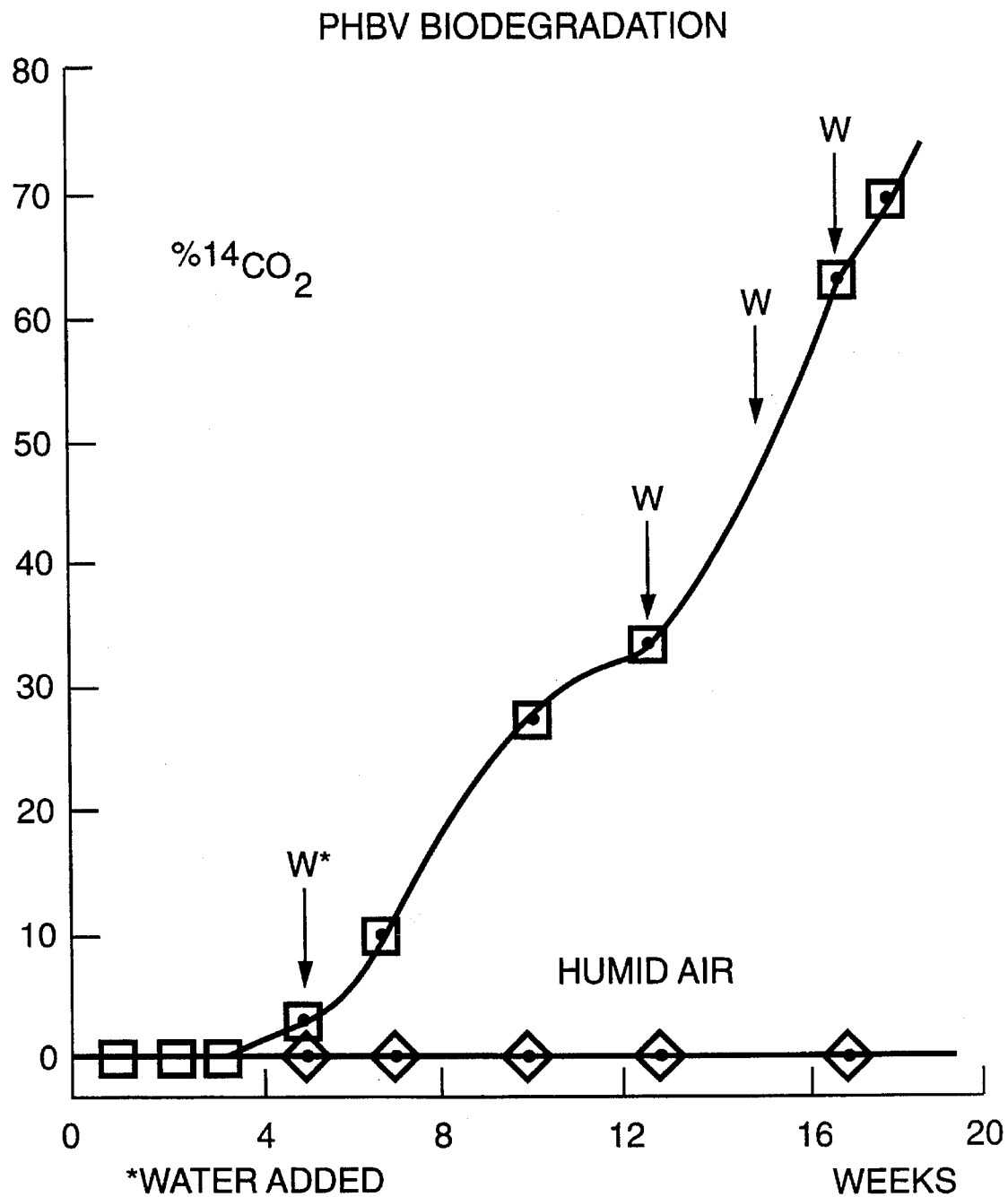
FIG. 17 illustrates the biodegradations of polyesters of 3-hydroxybutyric acid and 3-hydroxyvaleric acid (PHBV).

These polymers are produced by the fermentation of sugar bacterium ALCALIGENES EUTORPHUS and will degrade to carbon dioxide and water when placed in the presence of microorganisms found in soil, sewage, and river bottoms as shown in FIG. 17.

While PCL is claimed to undergo aerobic degradation, PHBV will degrade under either aerobic or anaerobic conditions.

Naturally occurring biodegradable substances are useful as fillers offering the advantage of reduced cost. Such fillers include but are not limited to starch, tree bark, ground paper, peat moss, and soy bean powder.

To enhance or optimize functional properties and cost it may be desirable to blend these resins with other materials such as additives and blending resins. The successful blending of the aliphatic polyester with additives to provide improved properties and reduced cost without impairing degradability is a most useful and surprising aspect of this invention.

Additives and blending resins include those which are either miscible or mechanically compatible with aliphatic polyester. The nonlimiting examples listed below are suitable for use with polycaprolactone:

| Miscable | Mechanically Compatible |
| --- | --- |
| PVC | Polyethylene |
| SAN | Polypropylene |
| ABS | Natural Rubber |
| Phenoxy | Styrene/Butadiene |
| Polycarbonate | Elastomer & Block Copolymers |
| Nitrocellulose | Polyvinylacetate |
| Poly (Vinylidene Chloride) | Polybutadiene |
| Styrene/Allyl Alcohol Copolymers | Ethylene/Propylene Rubber |

In addition, PCL may be blended with thermoplastic elastomers for improved toughness, adhesive, and flexibility. Especially suitable are the elastomeric segmented polyurethanes prepared from aliphatic polyester diols, aromatic or alicyclic diisocyanates; and, optionally, short chain diol or diamine chain-extender.

In one preferred embodiment, the skilled artisan can incorporate the many useful and unique properties of these additives into the coating composites to meet specific requirements of the various end uses contemplated. These materials may be added in from about 0% to about 30% by wt., preferably from about 10 to about 20% by wt. Although these materials alone are either slowly compostable or noncompostable, their use in limited amounts as described above does not impair the ultimate biodegradation of the coating materials.

Figure 1B:
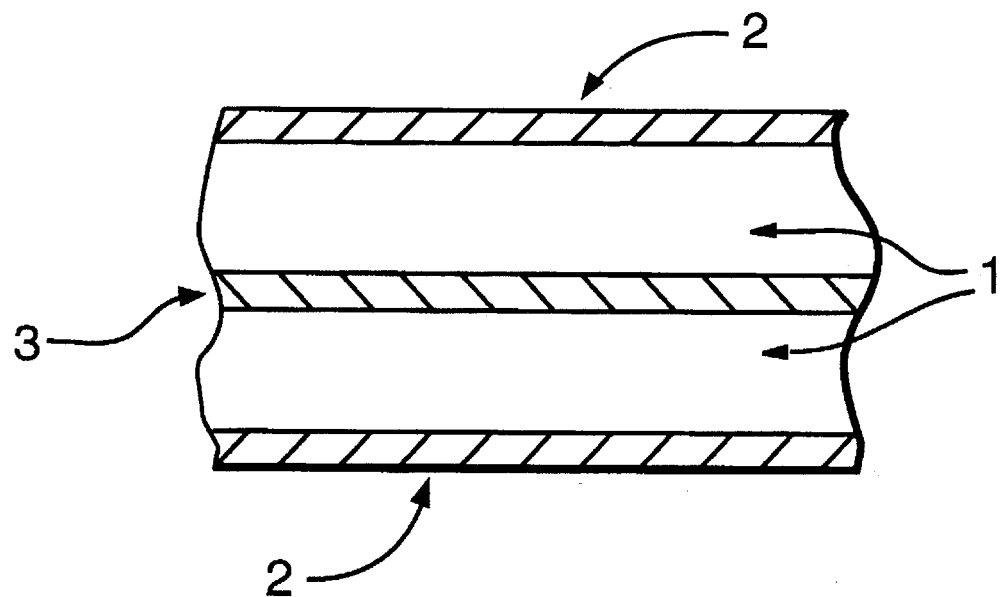
Figure 2:
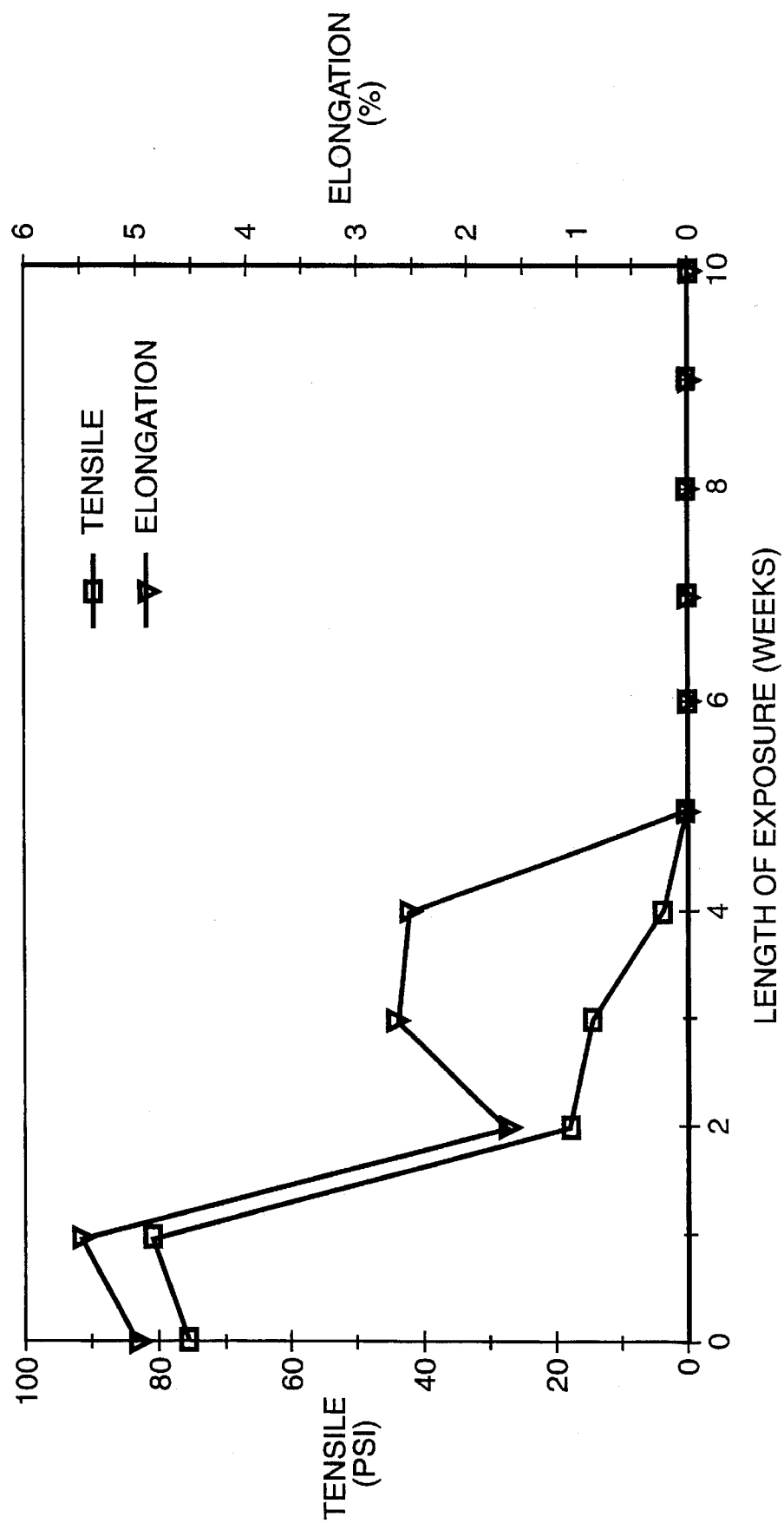
FIGS. 2–6 illustrate the degradation of properties during mesophilic composting for Examples 1–5.
Figure 3:
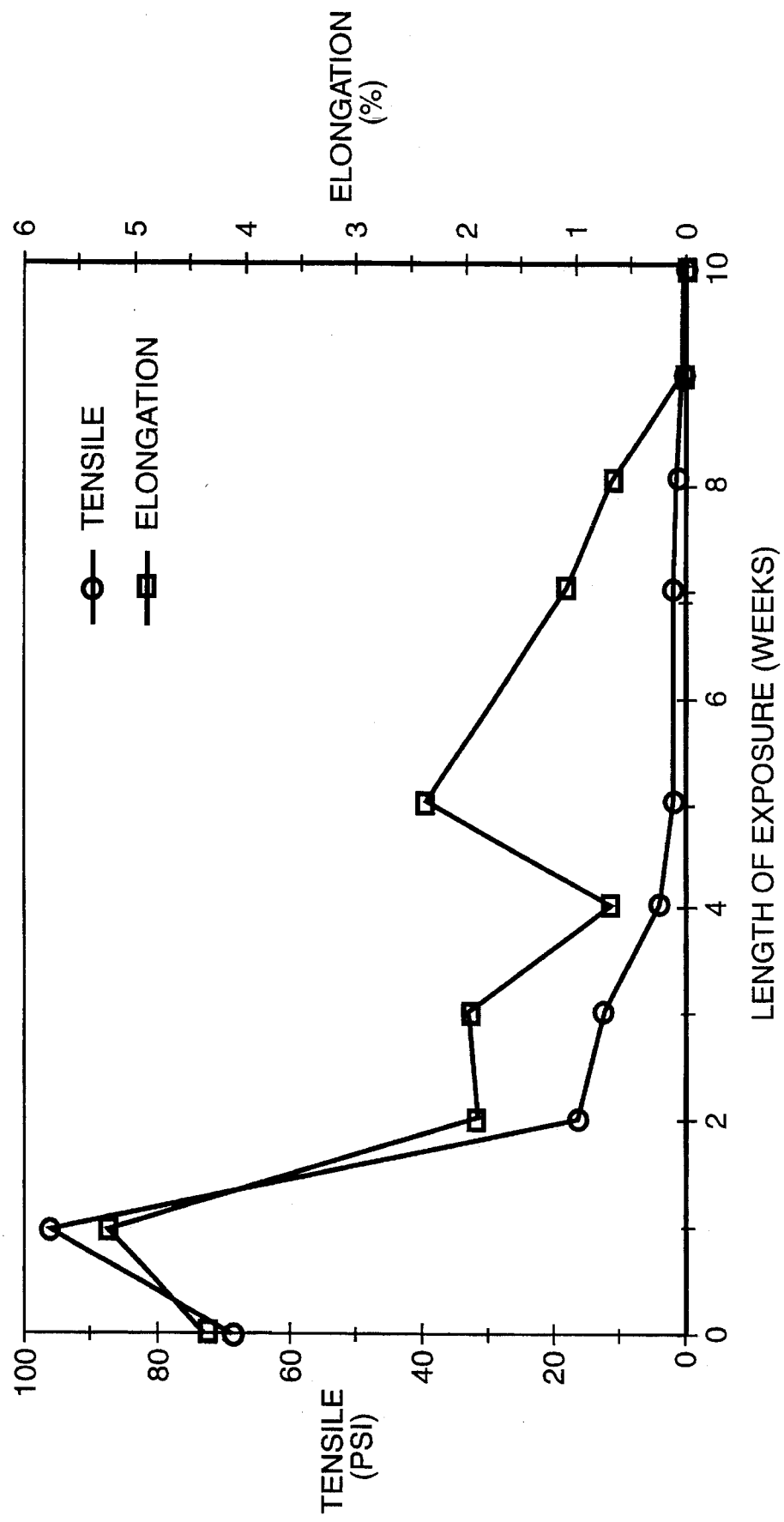
Figure 4:
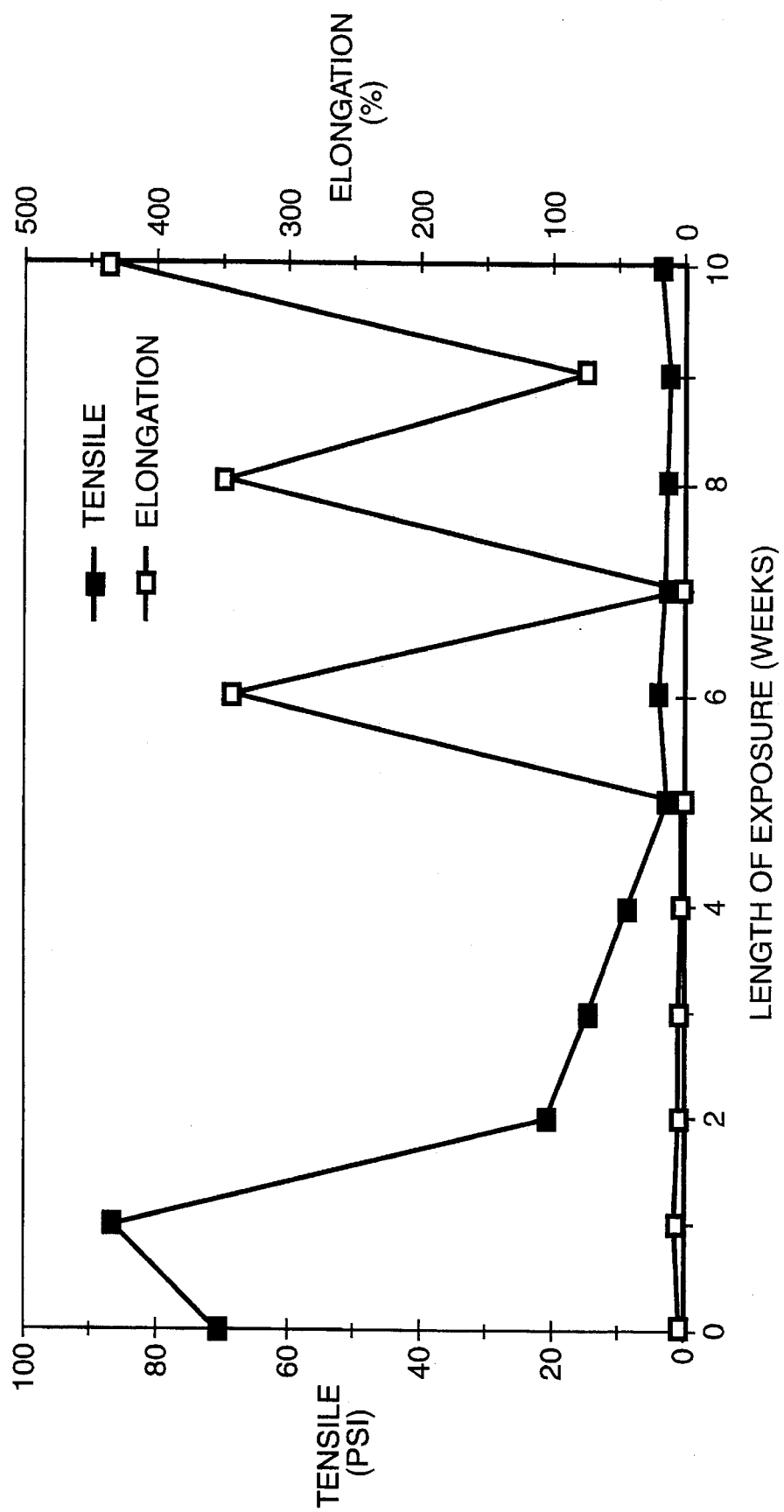
Figure 5:
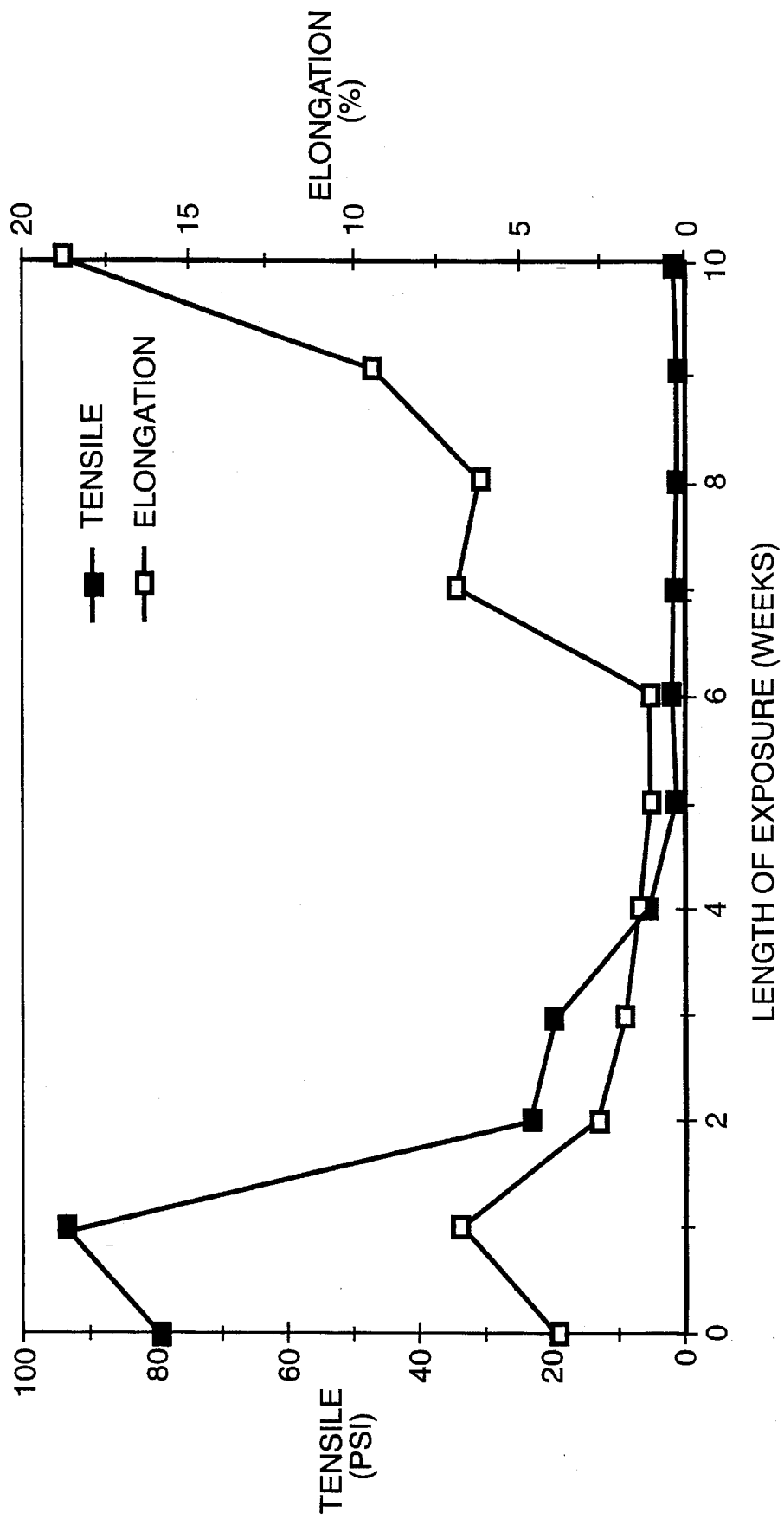
Figure 6:
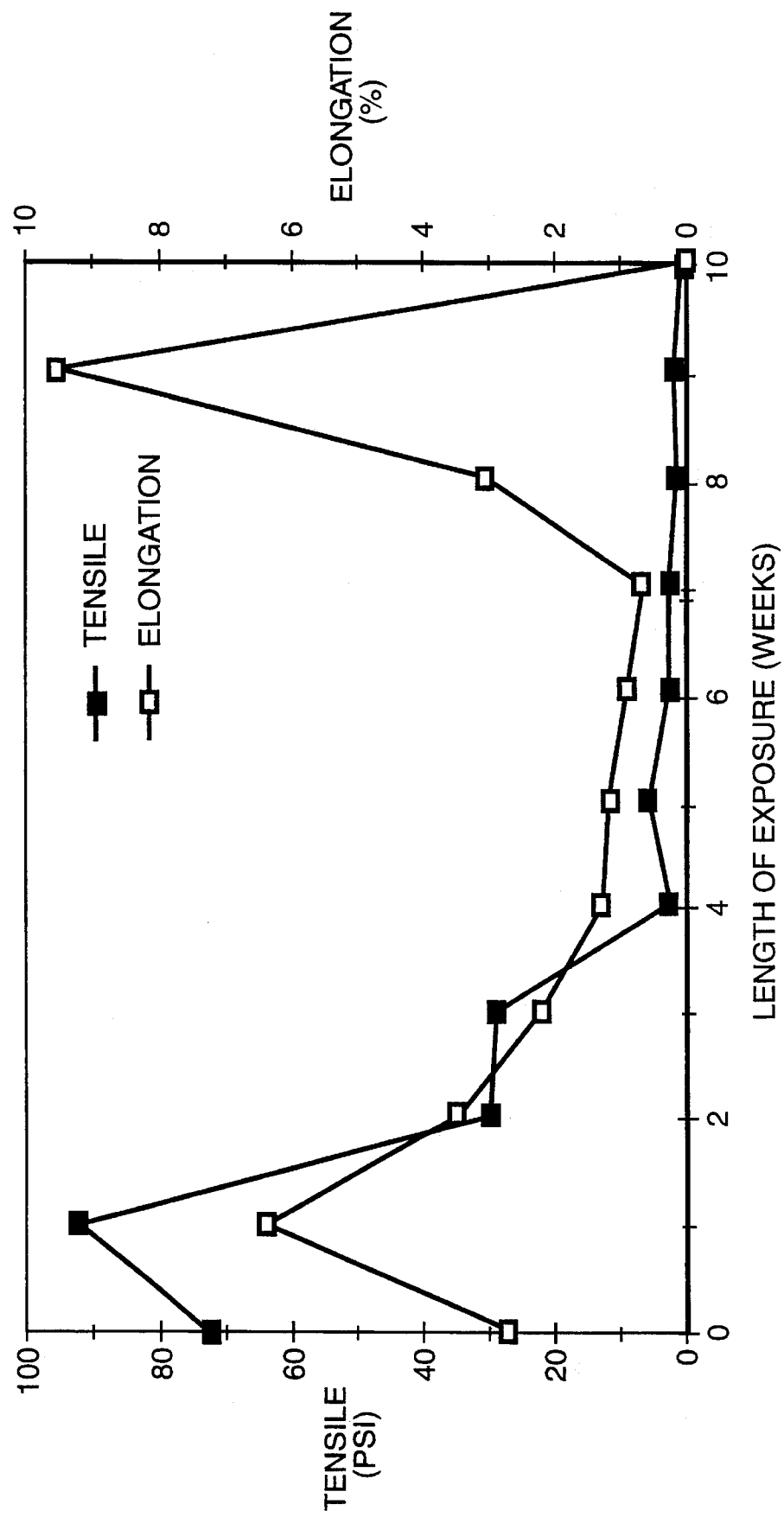
Figure 7:
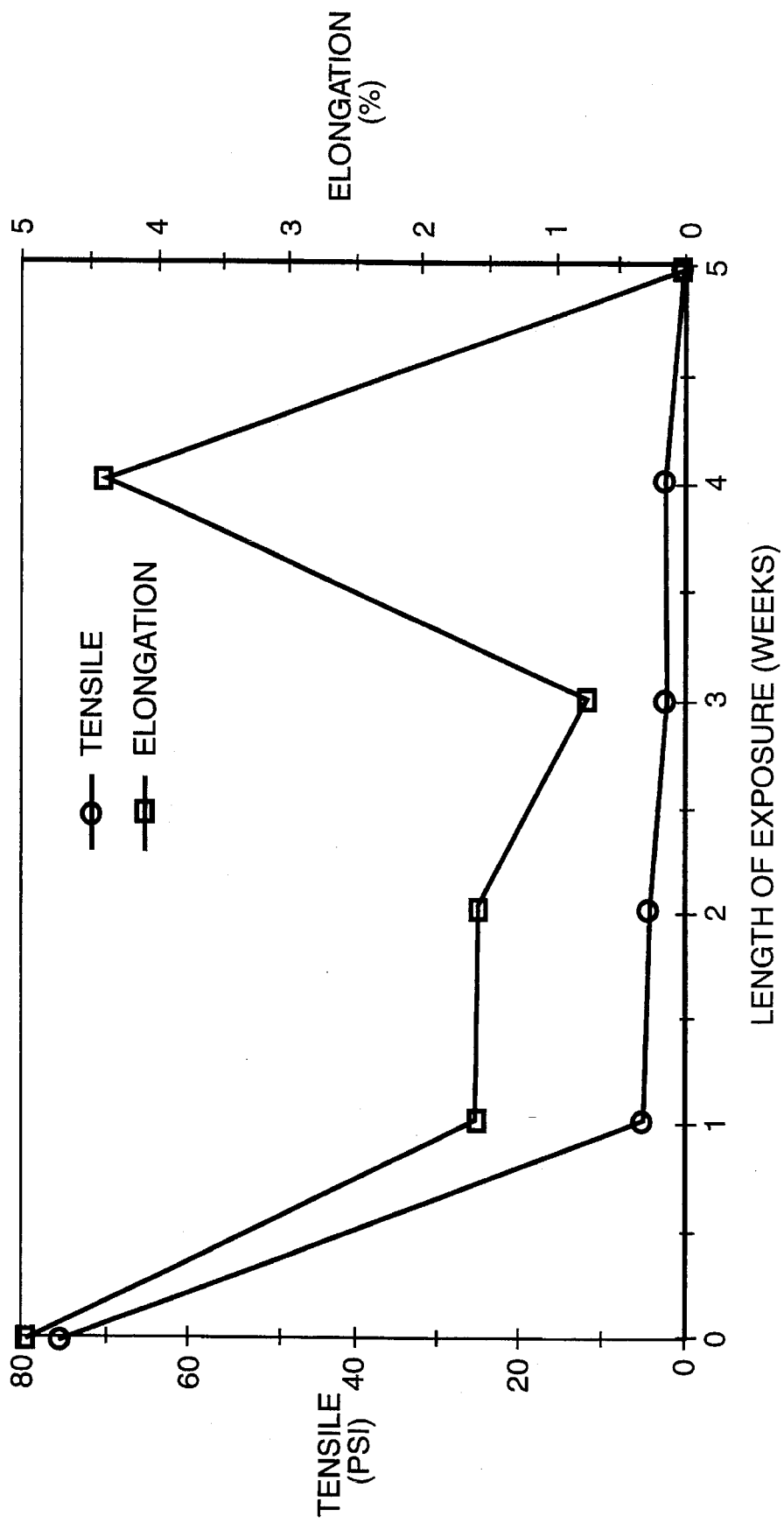
FIGS. 7–11 illustrate the degradation of properties during thermophilic composting for Examples 1–5.
Figure 8:
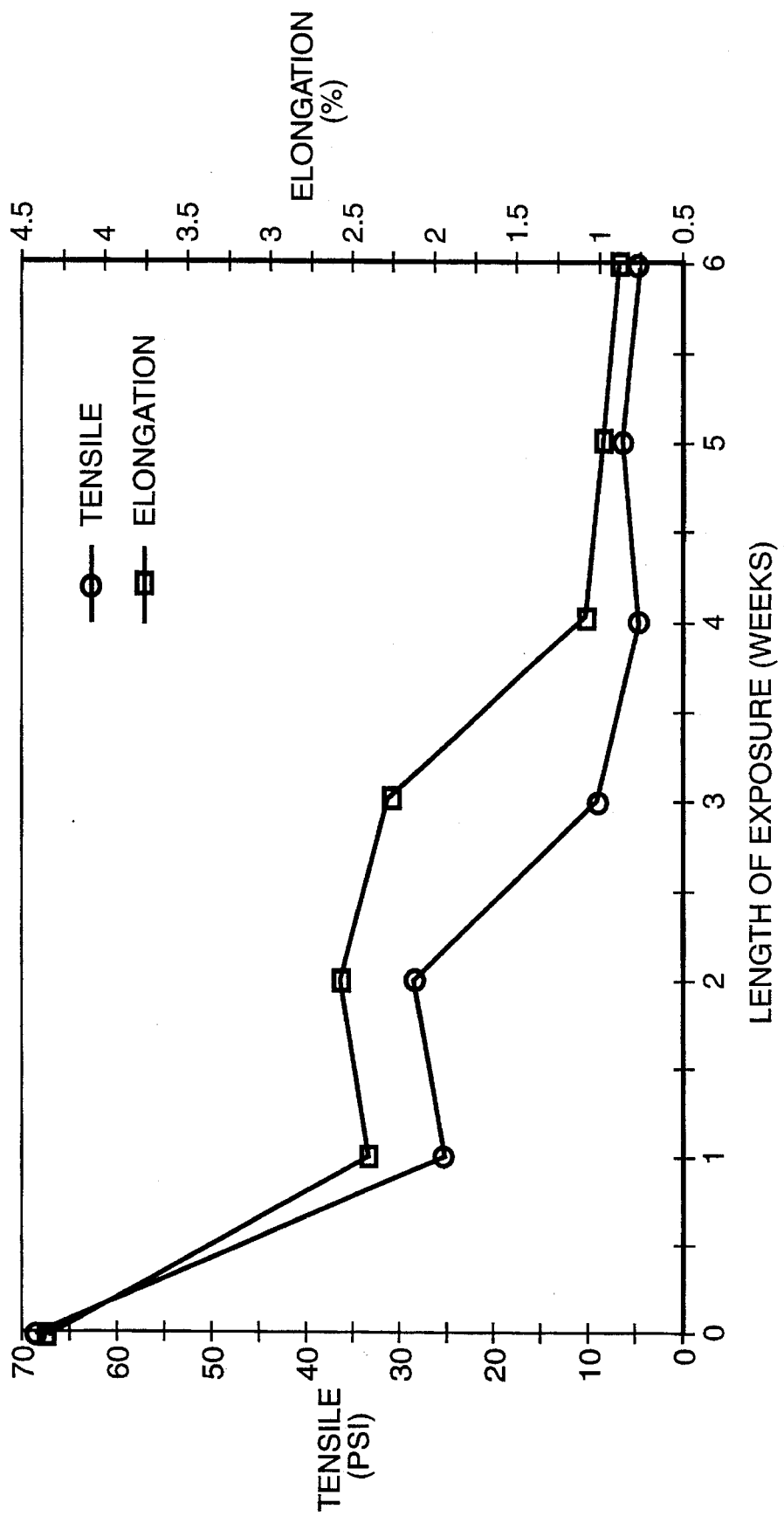
Figure 9:
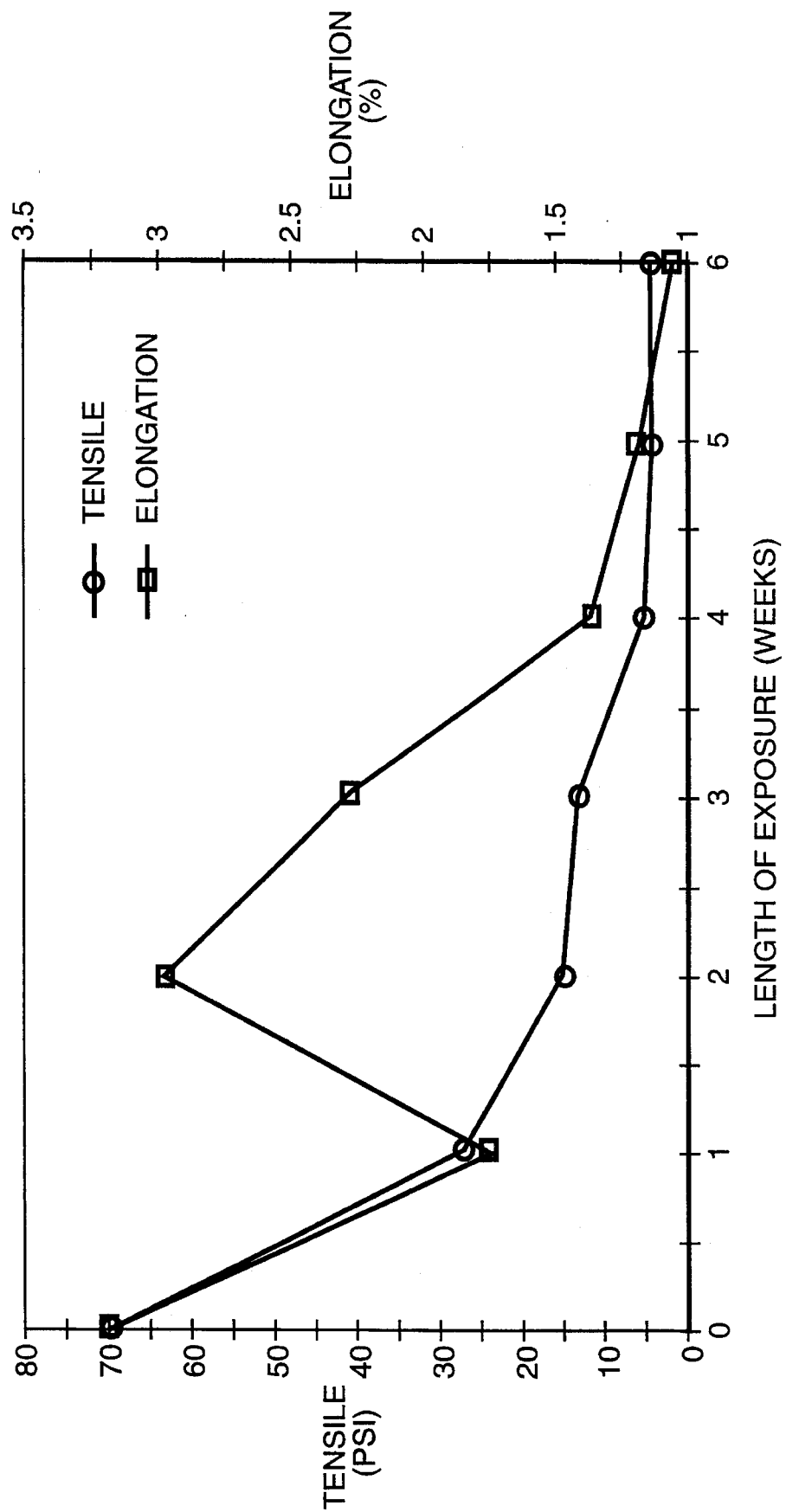
Figure 10:
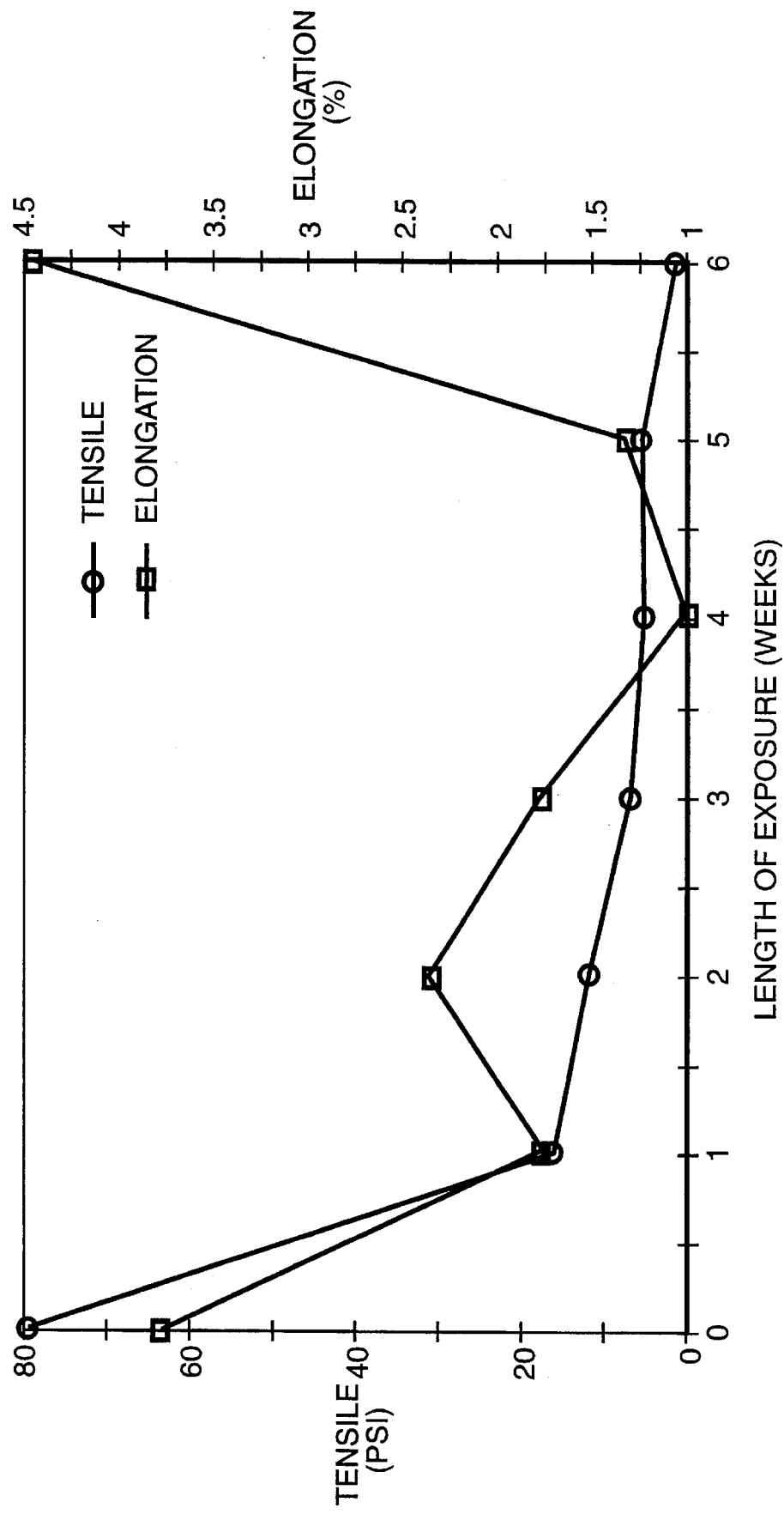
Figure 11:
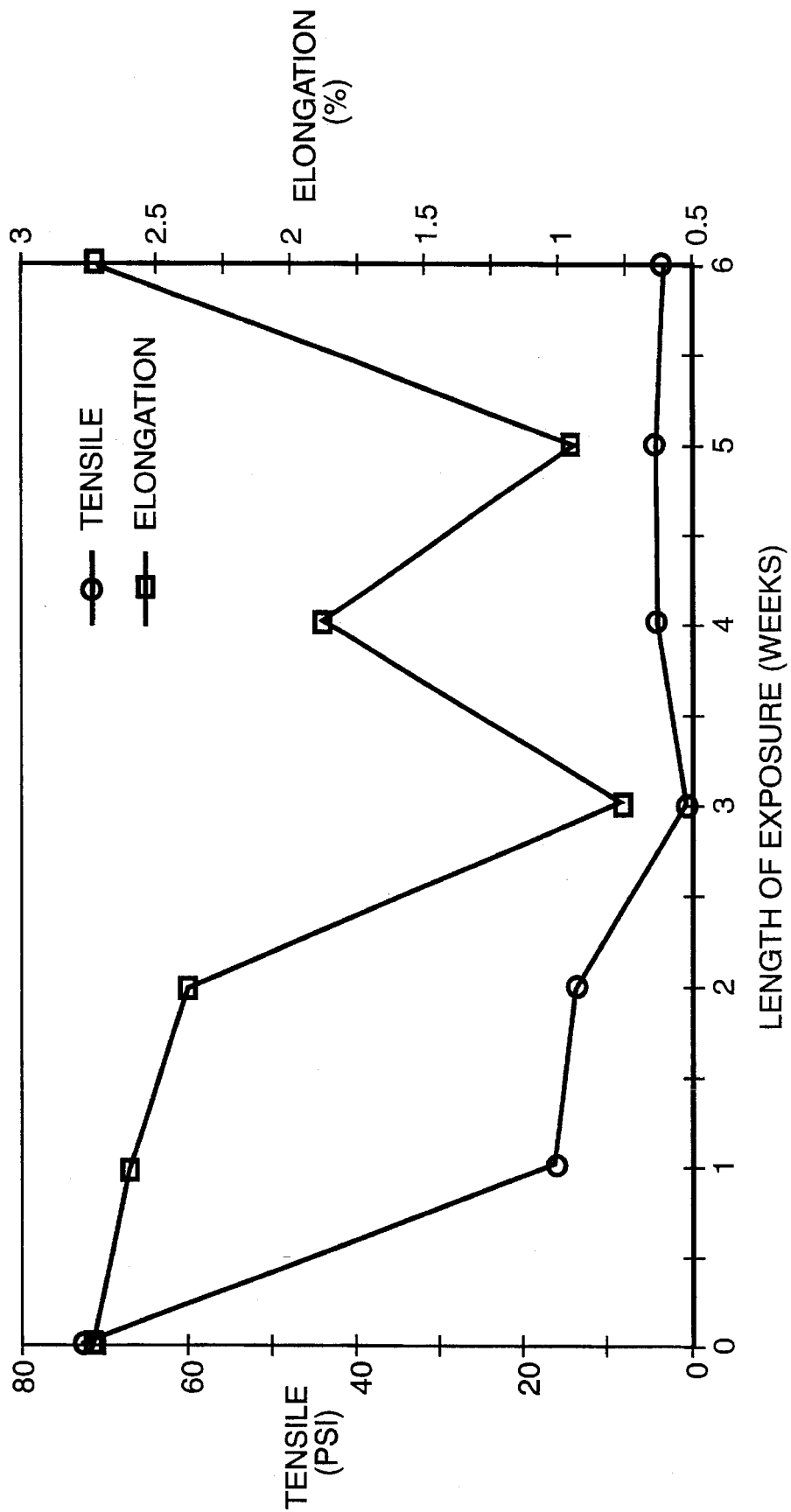
Figure 14:
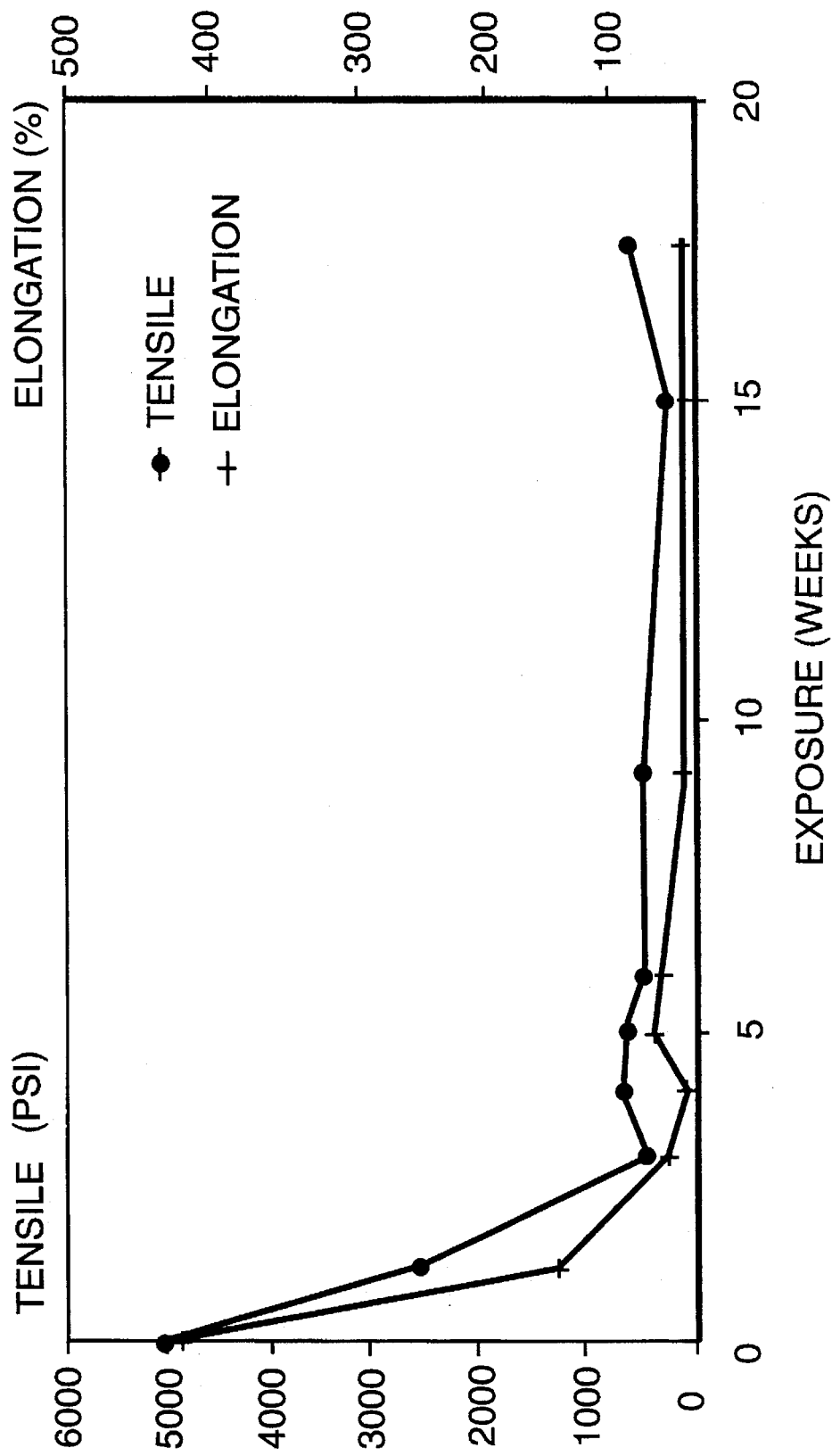
FIG. 14 illustrates the loss of mechanical properties observed for a film of polycaprolactone under outdoor composting conditions.
Figure 15:
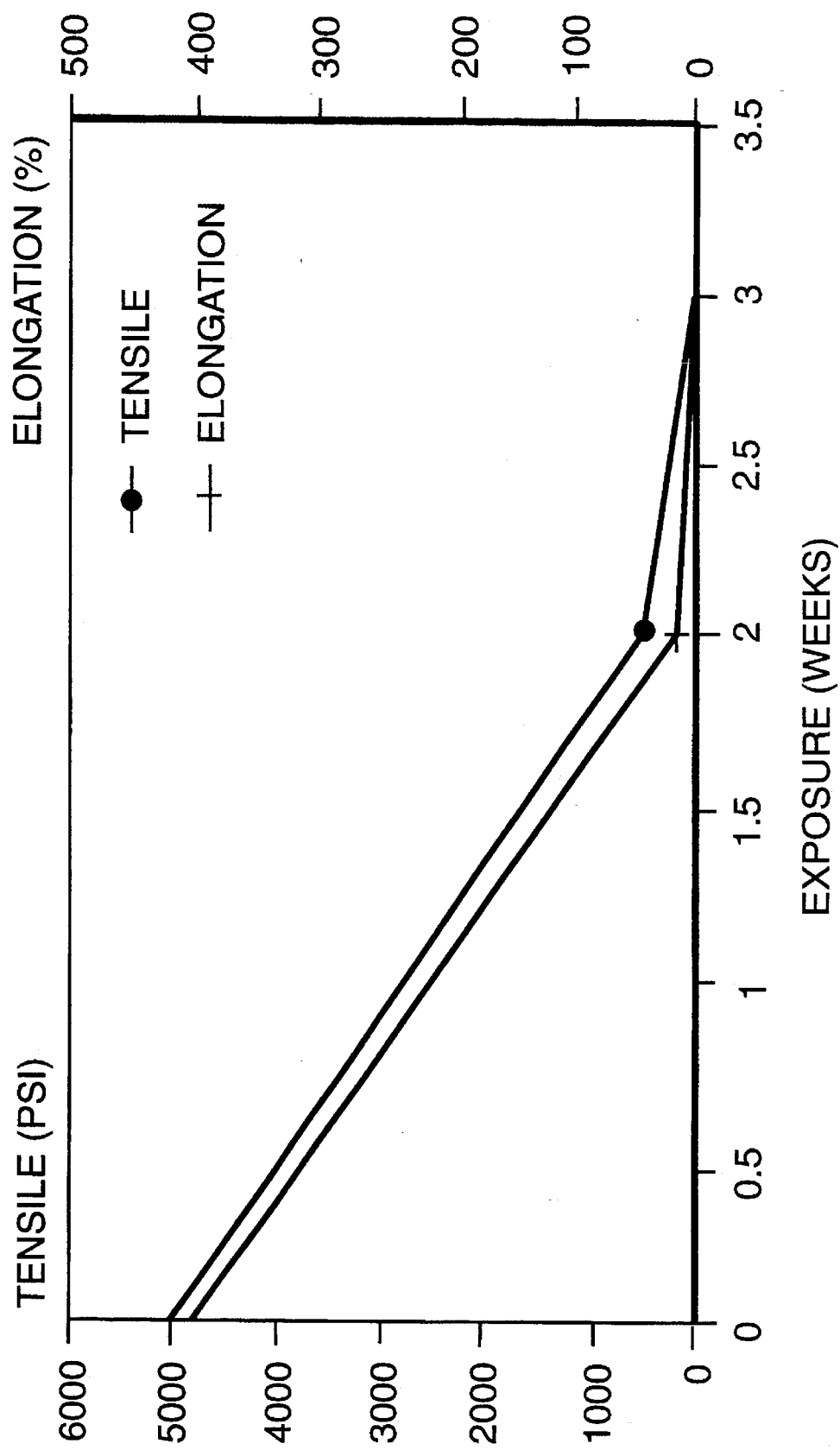
FIG. 15 illustrates the loss of mechanical properties observed for a film of polycaprolactone under indoor composting conditions.

As a unique way to achieve the properties of (a)–(g), discussed above, the composite packaging material in one embodiment of the present invention as illustrated in FIGS. 1a and 1b, represent a combination of biodegradable and photodegradable polymers which are capable of at least about 70% by weight (based upon the total weight of polymer) degradation through biological processes and up to about 30% by weight (based upon the total weight of polymer) degradation through a high frequency light initiated process.

Degradation through a high frequency light initiated process or photodegradation is theoretically understood to occur according to the following description. This description is illustrative and is not intended to be limiting to the invention as claimed.

The weathering of plastics is accelerated by sunlight. Polymer breakdown is usually accompanied by molecular transformations such as rearrangements and chain scission. These chemical reactions normally involve the breaking of carbon to carbon bonds. In general, reactions of this type do not result from radiation with wavelengths greater than about 5000 Å due to insufficient energy. Normally, radiation with wavelengths shorter than about 3000 Å is filtered by the earth's ozone layer. Therefore, only wavelengths in the range of about 3000 Å to about 4000 Å are of practical importance when considering the long term stability of plastics.

Radiation from the sun is not the only atmospheric element of importance. The presence of heat, oxygen, and moisture may be expected to contribute to polymer breakdown as well. Since these conditions, as well as the intensity of sunlight, vary depending on time of the year and geography, the rate of plastic degradation is difficult to predict. The plastic chemical composition, e.g., polyolefin, polyester, polyacrylate, polyamide, etc. and the nature of the pigments, lubricants and other additives will affect the chemical rate of environmental degradation. The polymer chemist, nevertheless, seeks to find commonalities among plastic material, that would at least in a general way allow predictions of similar, if not identical, pathways and rates of degradation. Such is the case with polyolefins in which the backbone is essentially comprised of carbon to carbon bonds.

In the area of packaging technology, polyethylene is of particular commercial importance as it accounts for about 69% of the 6 million tons of plastic utilized annually.

Investigations on the nature and cause of polyethylene degradation were primarily an attempt to find those compositions and processes yielding the best possible service life. One important variable identified during these studies was that carbonyl groups were unintentionally present in polyethylene, and that polymer breakdown in the presence of sunlight was accelerated by these groups. Carbonyl functionality, formed most likely by processing in the presence of heat and oxygen, would enhance the absorption of light at about 3500 Å.

The chemical reactions involved in the chain scission processes of such chemically modified polyethylene are presently referred to as Norrish Type I and Type II reactions:

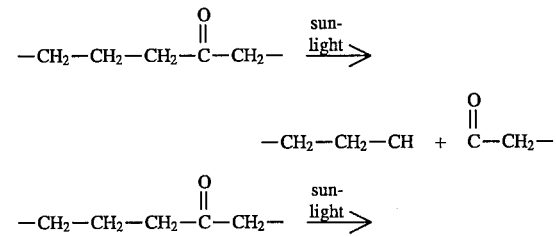

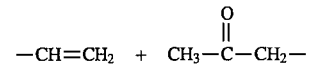

These reactions are characterized by chain scission leading to a reduction in molecular weight and by the generation of free radicals, which in the presence of oxygen, may cause a propagation of breakdown steps involving hydroperoxides and new carboxyl groups.

Thus, vinyl ketones or carbon monoxide may be copolymerized with ethylenically unsaturated compounds (e.g., ethylene, propylene, styrene, etc.) or polyolefins may be blended with a transition metal salt or an alkoxylated ethylenically unsaturated compound leading to modified polyolefins which, in the presence of light and particularly sunlight, are rapidly degraded.

In the present application, photodegradable polyolefin is understood to encompass materials which contain a polyolefin component and which are substantially completely degradable in the presence of light.

In a principal embodiment of the present invention, in addition to or in lieu of non- or slowly compostable materials, a chemically modified polyolefin can be used. A photodegradable polyolefin is a polyolefin that has been modified either in the polymer backbone or side chains; or, alternatively, through the presence of special additive so that light waves are readily absorbed leading to the formation of free radicals. Degradation of such modified polyolefins occurs rapidly in the presence of light and more rapidly in sunlight.

Examples of polyolefins rendered photodegradable through incorporation of carboxyl groups have been described in, for example, U.S. Pat. No. 4,857,605 (Lutz), incorporated in its entirety herein by reference. Lutz described a linear alternating polymer of carbon monoxide and at least one ethylenically unsaturated hydrocarbon. Such polymers were also blended with thermoplastic polyesters.

Additional readily degradable compositions are set forth in U.S. Pat. No. 3,753,952 (Guillet) in which monomers such as ethylene and styrene are copolymerized with up to 2% wgt. of vinyl ketones like methyl vinyl ketone. U.S. Pat. No. 3,860,538 sets forth blends of the copolymer with compatible polymers. These two patents are also incorporated in their entirety herein by reference.

As with the carbon monoxide copolymers, these vinyl ketone copolymers degrade in the presence of ultraviolet light by both Norrish Type I and II reactions.

Other mechanisms and routes to a photodegradable polyolefin are available. For example, salts of polyvalent transitions metals are effective at levels of about 5% by weight of the polymer. Typical compounds in this group include vanadium, iron, cobalt, zinc, copper, present as naphthanates, stearates, octoates, etc. These compounds are described in U.S. Pat. No. 3,901,838 to Clendinning. One such compound, PDQ, is a polyvalent transition metal salt and is offered commercially by Fully Compounded Plastics.

Another class of additive, alkoxylated ethylenically unsaturated compounds as described in U.S. Pat. Nos. 5,096,939 and 5,096,940 are also effected in rendering polyolefin photosensitive. One such compound, PH1350 E9, is an alkoxylated ethylenically unsaturated compound and is available from Techmer PM. The above described compounds can be blended with polyolefin in suitable amounts, for purposes of the present invention to render the polyolefin photodegradable.

The modifying groups and/or materials may be incorporated (e.g., mixed, blended or chemically reacted) in any amount into the polyolefin so as to satisfy the requirements (a)–(g) described above. Generally, these modifying groups and/or materials may be incorporated in amounts from about 1% to 10% by weight of the polyolefin, more preferably from about 2% to 5% by weight. Photodegradation is believed to occur due to the generation of free radicals which cause chain-scission.

In still another embodiment of the present invention, it has been found that relatively low molecular weight non-polymeric paraffin wax, most of which is comprised of hydrocarbons in the $C_{20}$–$C_{35}$ range may be incorporated into the coating materials. When this wax is used alone or in conjunction with aliphatic polyester coatings it (1) increases resistance to moisture vapor transmission and (2) is completely degradable under composting conditions.

In one particularly preferred embodiment, the paraffin wax can be a separate coating preferably having a thickness of from about 0.5 to about 3.0 mils. The wax is preferably coated over any portion of the polymeric coating described herein which has been applied to the paperboard base. Alternatively, the paraffin wax may be physically mixed with the polymeric coating in amounts of preferably from about 5% to about 80% by weight of polymeric coating. In certain applications paraffin wax alone may be coated directly onto paper or paperboard substrates.

In addition to blended compositions, different coating compositions may be coated onto the paperboard substrate in successive layers. Noncompostable or slowly compostable layers are so positioned so as not to interfere with composting of the remainder of the container. As an alternative, individual layers of the same or different blended materials may be used to form the substrate coatings. Noncompostable and slowly compostable materials may be used in blends or as intermediate layers in limited amounts. Their presence could contribute to the desired properties (a)–(g) described earlier or possibly lower the cost of the package. When used in blends these materials may preferably be contained in less than 30% by weight of the polymer coating and when found in film form may preferably be less than about 0.6 mils in thickness. These materials do not interfere with the compostability and degradation of the container and are found in the humus. After composting, these materials are from a practical standpoint indistinguishable from the rest of the humus.

Figure 19:
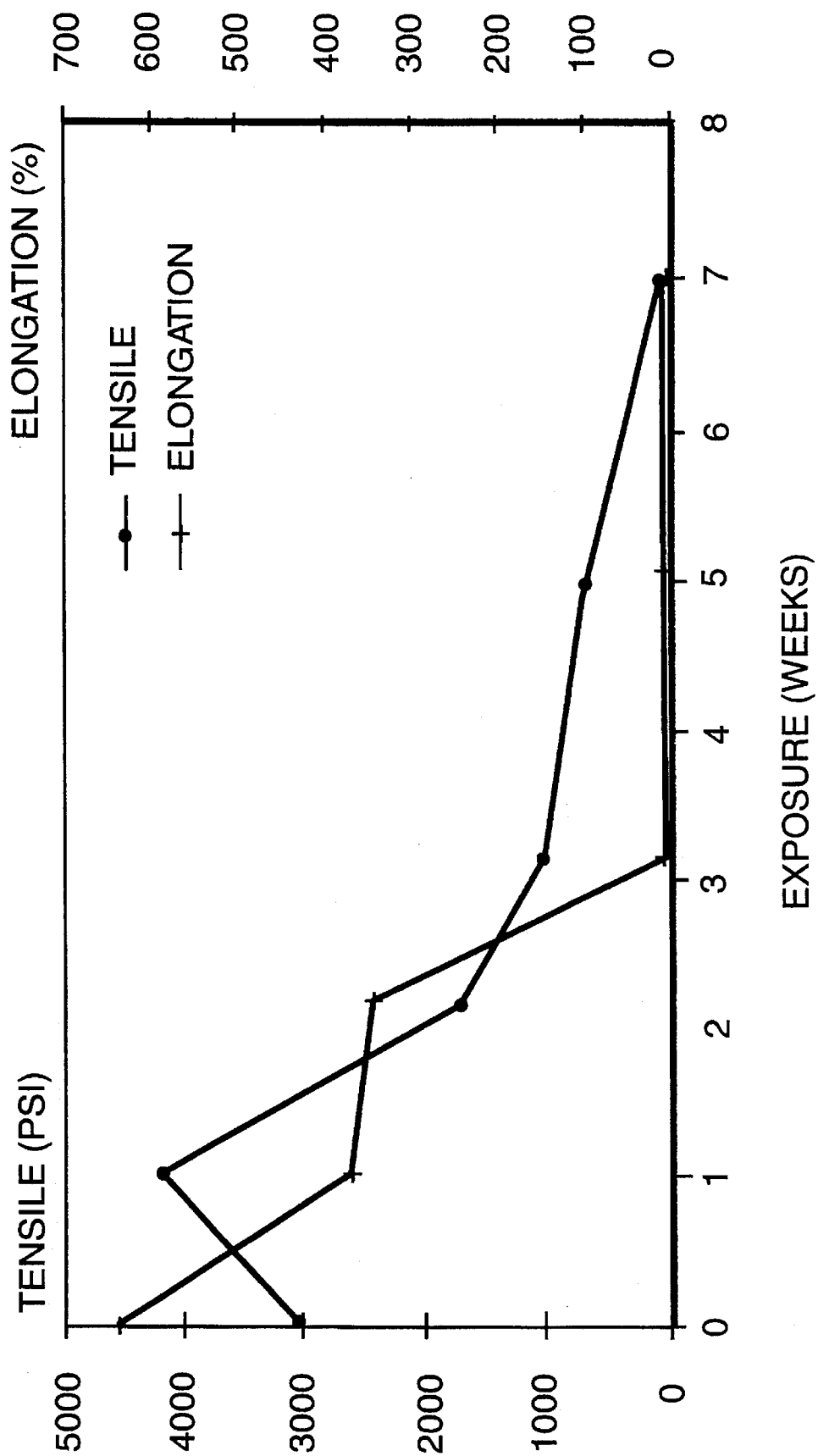
FIG. 19 illustrates the loss of mechanical properties observed for a film of polycaprolactone-polyethylene blends under indoor composting conditions.
Figure 20:
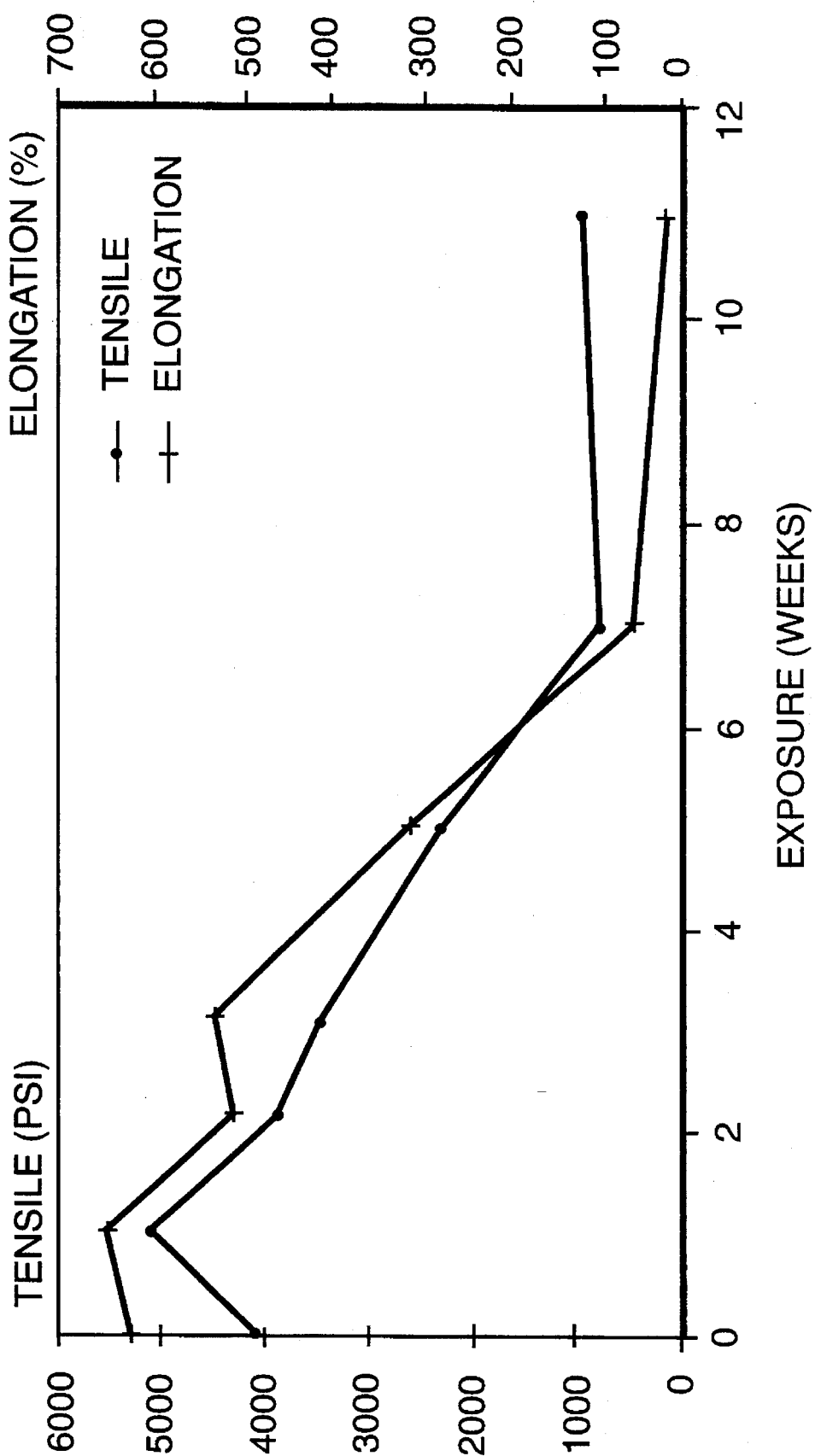
FIG. 20 illustrates the loss of mechanical properties observed for a film of polycaprolactone-polyethylene blends under indoor composting conditions.

In one preferred embodiment, the polyester coating may be comprised of either 100% by weight aliphatic polyester or mixtures of aliphatic polyester with polyethylene in which the polyethylene may be present at levels up to about 30% by weight. The addition of polyethylene reduces the rate of water vapor transmission which is advantageous for certain long shelf-life products. With the addition of as much as 30% by weight of polyethylene to aliphatic polyester, composting is slower, but nevertheless effective under typical composting conditions, as shown in FIGS. 18–20.

As an alternative or in addition to the materials described above, starch may be added to the coating materials according to the present invention. Starch may be added to either the polyester coating or the polyolefin coating in from about 0% to about 70% by weight and more preferably from about 40% to about 60% by weight. One commercially available starch based biodegradable material for use in the present invention is Mater-BI® produced by Novamont. This product contains up to 50% starch and 40% of a biodegradable resin material.

Since both the coatings and pulp-based substrate are degradable, disposable packages from these composites will decompose completely thus contributing to alternative waste treatment of paper based products. In addition to being completely degradable, the containers according to the present invention may be incinerated.

FIGS. 1a and 1b schematically outline preferred embodiments of the present invention setting forth a substrate or base of paper or paperboard 1, having a preferred basis weight of at least about 20 lb/ream.

The outer surface of paperboard base 1 is coated with from about 0.5 mil but not over about 3.0 mil of an aliphatic polyester such as polycaprolactone (layer 2).

The inner surface of paper or paperboard 1 can be coated with from about 0.5 to about 3.0 mil of polyolefin containing 1–5% by weight of a photodegradable polyolefin or an additive that renders the polyolefin photodegradable (layer 3). A photodegradable polyolefin is a polymer which breaks down in the presence of light. This knowledge has led to the development of polyethylene compositions with improved photodegradation properties. In one example, when carbon monoxide is copolymerized at levels of about 1–3% with ethylene, the resulting polymer is essentially the same in performance as conventional polyethylene with the exception of light absorption and subsequent degradation.

In one preferred embodiment, coating 2 (FIGS. 1a and 1b) may be comprised of at least 70% by weight and preferably about 90–100% by weight of aliphatic polyester at a thickness of from about 0.5 to about 3 mils each. Photodegradable coating 3 is a polyolefin modified with the addition of about 2% to about 5% by weight of a modifying additive and has a thickness of about 0.5 to about 3.0 mils. While meeting all of the requirements described in (a)–(g) above, this embodiment in particular provides an excellent barrier to moisture vapor. The modified polyethylene component which represents only about 1% to about 3% by weight of the total composition does not interfere with the rate of composting as it is confined to the innermost layer 3 and therefore does not hinder the degradation of the outmost layers, i.e., the aliphatic polyester and the cellulose pulp surfaces 1 and 2, which provide the initial sites for microbial attack. The pulp substrate 1 is accessible to microbial attack either through the degraded layer 2 or through the edges.

In another alternative, the exterior coating layer 2 may be eliminated in which case exposure of the pulp layer is immediate and direct.

The container according to the present invention can be used to contain a variety of liquids and liquid containing materials. For example, the container may be used for beverages such as milk, juice, fruit punch, soda, frozen Juice, and iced tea; fabric softener; butter; margarine; cosmetics such as shampoo, conditioner, suntan lotion and body lotion; pancake syrup; cooking oil; processed grains, fruits and vegetables; fruits; breads and bread products and single-use wet wipes.

In one embodiment, the container of the present invention has cut ends which are sealed to avoid seepage of the liquid into or out of the body of the paperboard. The sealing of the edges may be done in a variety of manners. It may be accomplished by coating the edges, or by thinning the material down near the cut edges, i.e., skivving. Skivving of the edges is followed by folding the skivved areas over the cut edges.

In another preferred embodiment, there is a moisture-impervious membrane provided over the contents. Such membranes are sometimes referred to as lidding stock or material. Membranes for this application are typically comprised of a strong barrier top layer with a heat sealable lower layer. Non-limiting examples of top layers which may be used in the present invention, include paper, polyester, polyethylene, metallized polyester, and polypropylene. Non-limiting examples of heat seal layers include polyethylene, ethylene-vinylacetate copolymers, and aliphatic polyester. The edges of the membrane are adhered to the upper edges of the container and provide an effective storage and shipping seal. The membrane should peel away from the edges of the container at the seal without exposure of pulp fibers. Additionally, a moisture-impervious membrane can be heat sealed at the bottom of the container as well. The bottom of the container is preferably heat sealed by applying heat and pressure, as well known in the art.

In one embodiment, when the material to be contained is wet towellettes, the consumer obtains the product, rips open a perforation providing a slot or opening in the paperboard, permitting the hinged cap-like lid to be raised. This exposes the membrane, which is easily peeled off with the fingers and either stored in the box or thrown away. Thereafter, sealing is done entirely by raising and lowering of the hinged lid. The moist towels or napkins are preferably stacked and lie horizontally in the container and may be individually removed as needed.

It is also possible to provide a separate or separable pouch bag or liner within the container to provide further waterproofing protection. Alternatively, this separable liner may be supplied during refilling of the container using a prepackaged bag of replacement wipes.

The container according to the present invention provides sufficient stiffness to provide the consumer with a container having handleability and to provide crush resistance of the box during storage, shipment, and under conditions of household use.

Containers according to the present invention preferably have a compression strength of at least about 60 lbs. and more preferably at least about 70 lbs. as tested in accordance with *TAPPI* test procedure T-804. The container should also preferably have a cross directional Ring Crush of at least about 115 lbs. and more preferably at least about 140 lbs. Ring crush can be defined according to *TAPPI* Test Procedure T818 OM-87. The compression strength of the containers is indicative of stacking and handling ability of the containers. Higher stiffness and crush resistance in the cross direction of the paperboard provides improved stacking and handling of the containers.

The following examples are illustrative of the invention embodied herein.

EXAMPLES

Examples 1–5

Film Extrusion Laminations were conducted using an Egan single flight screw through a 15 inch T-type die with a 30 mil gap setting.

Polycaprolactone P-767E was extruded with a temperature profile of about 200° F. in the feed zone; about 225°–250° F. in the barrel and about 245° F. in the die.

Films were collected on a matte finished steel chill roll at about 55°–60° F. and combined through a nip roll with the substrate after surface treatment of the latter with corona discharge or flame to enhance adhesion.

All film thicknesses were about 1.0–1.5 mil. The paperboard was DLN grade (Schoeller Technical Papers). Linear low density polyethylene grade was supplied by Union Carbide. Low density polyethylene homopolymer was grade Polyethylene NATR, 155, supplied by Quantum Chemical Corporation. ECO-NATURAL #5020, an ethylene-ketone copolymer with a molecular formula —$(C_2H_4)$—$(C_4H_6O)$ was supplied by Ecolyte Atlantic, Inc., Baltimore, Md. PDQ, a long chain acid salt of a transition metal, was supplied by Fully Compounded Plastics, Inc., Wecaten, Ill. Polycaprolactone, PCL, was Grade 767 supplied by Union Carbide.

In Experiments 1 and 2, a mixture of biodegradable and photodegradable polymers were coated on both sides of the paperboard. In spite of the high polyethylene content of the film used in these constructions, the rate of moisture vapor transmission was still high.

As examples of the construction illustrated in FIG. 1a, Experiments 3, 4, and 5 resulted in improvements in water vapor barrier properties by a factor of about 10–20.

| Experiment | Side 1 (outside) Composition/% Wt. | | Side 2 (inside) Composition/% wt | | Moisture Vapor Rate g/100 in$^2$/day |
|---|---|---|---|---|---|
| 1 | PCL-767 | 70 | Same as side 1 | | 7.0 |
|   | Linear Low Density Polyethylene* | 28.75 | | | |
|   | ECO-5020 | 1.25 | | | |
| 2 | PCL-767 | 60 | Same as side 1 | | 7.3 |
|   | Linear Low Density Polyethylene* | 38 | | | |
|   | ECO-5020 | 2 | | | |
| 3 | PCL-767 | 90 | Linear Low Density Polyethylene** | 95 | 0.87 |
|   | Linear Low Density Polyethylene* | 10 | ECO-5020 | 5 | |
| 4 | PCL-767 | 90 | Low Density Polyethylene** | 95 | 0.35 |
|   | Linear Low Density Polyethylene* | 10 | ECO-5020 | 5 | |
| 5 | PCL-767 | 90 | Low Density Polyethylene** | 97 | 0.35 |
|   | Linear Low Density Polyethylene* | 10 | PDQ | 3 | |

*Supplied by Union Carbide
**Polyethylene NATR .155 supplied by Quantum Chemical Corporation

COMPOSTABILITY EVALUATIONS

I. Mesophilic Compost Test

A. Procedure CAN/CSA—Z218./-M92 Standard Practice for Exposing Plastics to a Simulated Soil Environment Test specimens are buried in a soil bed of composted material maintained at about 20–30% moisture. The soil bed is contained within an inert cabinet stored at about 30±0.5° C. and a relative humidity of about 85–95%. At the indicated times, test samples are removed and inspected visually, and for changes in tensile properties.

B. Results as summarized in FIGS. 2–6 illustrate loss of tensile properties of the compositions in Examples 1–5. In each case, all or most of these properties were degraded during an eight week period.

Visual examination of samples from Experiments 3, 4, and 5 at 5 weeks revealed film residues of side 2 confirming that these polyethylene coatings were not biodegradable, and the biological attack through side 1 and the paperboard substrate was essentially complete.

II. Thermophilic Test Procedure

A. Thermophilic Compost Exposure

The thermophilic compost exposure is conducted using a typical outdoor compost pile. Active composted humus, leaves and grass clippings are combined to create the pile. A balance of carbon to nitrogen is maintained within this mixture. The samples are then placed near the center of different layers. They were then periodically sampled from the pile in order to determine if any property loss had occurred. Samples were visually inspected or tested per ASTM Method D882 (thin films), D828 (paper/paperboard), etc. The piles, when fully active with bacteria, can reach core temperatures of about 150° F.

B. Results are illustrated in FIGS. 7–11.

Material from Experiments 1 and 2 (FIGS. 7 and 8) were rapidly degraded during the first 1–3 weeks of exposure. Very little or none of the sample remained after five weeks.

The compositions of Experiments 3, 4, and 5 were substantially degraded after about six weeks except for the polyethylene coatings on side 2 which remained intact.

III. Biodegradability Evaluation Using ASTM D 5209 Aerobic Biodegradation Assay

Results for Experiments 1–5 are tabulated in FIG. 12. All materials were found to be biodegradable with carbon conversions in general reflecting the amount of polycaprolactone present.

IV. Evaluation of Photodegradability

A. Test Procedure

Side 2 film layers were peeled away from the composite and tested in accordance with ASTM G 53 and D 5206 Test Methods. The samples were exposed using a QUV™ Accredited Weathering Tester. The exposure apparatus used UVA-340 lamps with peak emission at about 343 nm.

The film sample from side 2 of Experiment 3 was 100% degraded at the end of the test period (56.9 light hours). The film from Experiment 4 had lost 43% of its tensile strength after the same exposure. The film from Experiment 5 readily turned to powder during testing.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A compostable container for packaging a liquid or liquid containing material comprising:

a base of paperboard having two sides;

a coating of a biodegradable linear aliphatic polyester or paraffin wax on the side of the base which constitutes the outer surface of the container;

a coating of a photodegradable polyolefin on the side of the base which constitutes the inner surface of the container;

said container being degradable to form carbon dioxide, water and biomass; and said base with said biodegradable coating and said photodegradable coating having a moisture vapor transmission rate of less than about 0.87 grams per 100 square inches per day.

2. The container according to claim 1, wherein each coating is from about 0.5 to about 3.0 mils. thick.

3. The container according to claim 1, wherein the biodegradable coating is heat sealable, flexible, adhesive, resistant to stress cracks, and abrasion resistant.

4. The container according to claim 1, wherein the biodegradable aliphatic polyester is selected from the group consisting of polycaprolactone, poly-3-hydroxybutyric acid, poly- 3-hydroxyvaleric acid, polyglycolic acid, copolymers of glycolic acid and lactic acid and polylactide.

5. The container according to claim 4, wherein the biodegradable aliphatic polyester is polycaprolactone.

6. The container according to claim 2, wherein said biodegradable aliphatic polyester and/or said polyolefin further contain a resin selected from the group consisting of PVC, SAN, ABS, phenoxy, polycarbonate, nitrocellulose, polyvinylidene chloride, a styrene/allyl alcohol copolymer, polyethylene, polypropylene, natural rubber, a styrene/butadiene elastomer and block copolymer, polyvinylacetate, polybutadiene, ethylene/propylene rubber, starch, and thermoplastic segmented polyurethane.

7. The container according to claim 6, wherein the resin is polyethylene.

8. The container according to claim 1, wherein the photodegradable layer is modified polyethylene.

9. The container according to claim 1, wherein the photodegradable layer is rendered photodegradable by the incorporation of a carbonyl group into the polyolefin.

10. The container according to claim 1, wherein the photodegradable layer is rendered photodegradable by incorporation of a ketone group into the polyolefin.

11. The container according to claim 1, wherein the photodegradable layer is rendered photodegradable by the incorporation of a salt of a polyvalent transition metal into the polyolefin.

12. The container according to claim 1, wherein the photodegradable layer is rendered photodegradable by the incorporation of an alkoxylated ethylenically unsaturated compound into the polyolefin.

13. The container according to claim 1, in which degradation of the paperboard and biodegradable aliphatic polyester occur by biodegradation and degradation of the polyolefin coating occurs by photodegradation.

14. The container according to claim 1, further comprising paraffin wax as a layer under or over one or both of the coatings or paraffin wax is mixed with one or both of the coatings.

15. A compostable container for packaging a liquid or liquid containing material comprising:

a base having two sides and comprising a photodegradable polyolefin positioned between two paperboard substrates;

a coating of a biodegradable linear aliphatic polyester or paraffin wax on both sides of said base;

said container being degradable to form carbon dioxide, water and biomass; and said base with said biodegradable coating and said photodegradable coating having a moisture vapor transmission rate of less than about 0.87 grams per 100 square inches per day.

16. The container according to claim 15, wherein each coating and said polyolefin is from about 0.5 to about 3.0 mils. thick.

17. The container according to claim 15, wherein the biodegradable coating is heat sealable, flexible, adhesive, resistant to stress cracks, and abrasion resistant.

18. The container according to claim 15, wherein the biodegradable aliphatic polyester is selected from the group consisting of polycaprolactone, poly-3-hydroxybutyric acid, poly- 3-hydroxyvaleric acid, polyglycolic acid, copolymers of glycolic acid and lactic acid and polylactide.

19. The container according to claim 18, wherein the biodegradable aliphatic polyester is polycaprolactone.

20. The container according to claim 16, wherein said biodegradable aliphatic polyester and/or said polyolefin further contain a resin selected from the group consisting of PVC, SAN, ABS, phenoxy, polycarbonate, nitrocellulose, polyvinylidene chloride, a styrene/allyl alcohol copolymer, polyethylene, polypropylene, natural rubber, a styrene/butadiene elastomer and block copolymer, polyvinylacetate, polybutadiene, ethylene/propylene rubber, starch, and thermoplastic segmented polyurethane.

21. The container according to claim 20, wherein the resin is polyethylene.

22. The container according to claim 15, wherein the photodegradable polyolefin is modified polyethylene.

23. The container according to claim 15, wherein the photodegradable layer is rendered photodegradable by the incorporation of a carbonyl group into the polyolefin.

24. The container according to claim 15, wherein the photodegradable layer is rendered photodegradable by incorporation of a ketone group into the polyolefin.

25. The container according to claim 15, wherein the photodegradable layer is rendered photodegradable by the incorporation of a salt of a polyvalent transition metal into the polyolefin.

26. The container according to claim 15, wherein the photodegradable layer is rendered photodegradable by the incorporation of an alkoxylated ethylenically unsaturated compound into the polyolefin.

27. The container according to claim 15, in which degradation of the paperboard and biodegradable aliphatic polyester occur by biodegradation and degradation of the polyolefin coating occurs by photodegradation.

28. The container according to claim 15, wherein the coating is a biodegradable linear aliphatic polyester and further comprising paraffin wax as a layer under or over one or both of the coatings or paraffin wax mixed with one or both of the coatings.

* * * * *

UNITED STATES PATENT AND TRADEMARK OFFICE
CERTIFICATE OF CORRECTION

PATENT NO. : 5,540,962
DATED : July 30, 1996
INVENTOR(S) : Stuart P. SUSKIND

It is certified that error appears in the above-indentified patent and that said Letters Patent is hereby corrected as shown below:

Claim 1, column 15, lines 41-42, delete "or paraffin wax"; and column 15, line 49, after "water and biomass; and" insert --wherein said base has a cross-directional Taber stiffness of aobut 50 to about 150, a thickness of about 4 to about 25 mils and a basis wight of at least 30 lbs/ream--.

Claim 15, column 16, lines 38-39, delete "or parafinn wax"; and column 16, line 41, after "water and biomass; and" insert --wherein said base has a cross-directional Taber stiffness of aobut 50 to about 150, a thickness of about 4 to about 25 mils and a basis wight of at least 30 lbs/ream--.

Signed and Sealed this

Twenty-sixth Day of November 1996

Attest:

BRUCE LEHMAN

*Attesting Officer*     *Commissioner of Patents and Trademarks*